United States Patent
Won et al.

(10) Patent No.: US 10,340,263 B2
(45) Date of Patent: Jul. 2, 2019

(54) INTEGRATED CIRCUIT FOR REDUCING OHMIC DROP IN POWER RAILS

(71) Applicant: SAMSUNG ELECTRONICS CO., LTD., Suwon-si, Gyeonggi-do (KR)

(72) Inventors: Hyo Sig Won, Suwon-si (KR); Chan Uk Shin, Seoul (KR); Kwang Ok Jeong, Hwaseong-si (KR); Kwon Chil Kang, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/718,275

(22) Filed: Sep. 28, 2017

(65) Prior Publication Data
US 2018/0166432 A1 Jun. 14, 2018

(30) Foreign Application Priority Data
Dec. 14, 2016 (KR) .......................... 10-2016-0170757

(51) Int. Cl.
| | |
|---|---|
| *H01L 27/02* | (2006.01) |
| *H01L 29/06* | (2006.01) |
| *H01L 23/522* | (2006.01) |
| *G06F 17/50* | (2006.01) |
| *H01L 23/528* | (2006.01) |
| *H03K 19/00* | (2006.01) |
| *H03K 5/00* | (2006.01) |
| *H03K 3/03* | (2006.01) |
| *H03K 5/134* | (2014.01) |
| *H01L 27/118* | (2006.01) |

(52) U.S. Cl.
CPC .......... *H01L 27/0207* (2013.01); *G06F 17/50* (2013.01); *G06F 17/5077* (2013.01); *H01L 23/528* (2013.01); *H01L 23/5226* (2013.01); *H01L 23/5286* (2013.01); *H01L 29/06* (2013.01); *H01L 29/0649* (2013.01); *H03K 19/0008* (2013.01); *H01L 2027/11881* (2013.01); *H03K 3/0315* (2013.01); *H03K 5/134* (2014.07); *H03K 2005/00195* (2013.01)

(58) Field of Classification Search
None
See application file for complete search history.

(56) References Cited

U.S. PATENT DOCUMENTS

| | | | |
|---|---|---|---|
| 6,818,929 B2 | 11/2004 | Tsutsumi et al. |
| 7,240,314 B1 | 7/2007 | Leung |
| 7,398,489 B2 | 7/2008 | Dinter et al. |
| 8,635,572 B1 | 1/2014 | Jin et al. |
| 8,640,074 B2 | 1/2014 | Huang et al. |

(Continued)

*Primary Examiner* — Cassandra F Cox
(74) *Attorney, Agent, or Firm* — F. Chau & Associates, LLC

(57) ABSTRACT

An integrated circuit includes a plurality of power rail pairs and a circuit chain. Each of the plurality of power rail pairs includes one of a plurality of high power rails configured to provide a first power supply voltage and one of a plurality of low power rails configured to provide a second power supply voltage that is lower than the first power supply voltage. The circuit chain includes a plurality of unit circuits that are cascade-connected such that an output of a previous unit circuit is provided as an input of a next unit circuit. The plurality of unit circuits are connected distributively to the plurality of power rail pairs.

18 Claims, 24 Drawing Sheets

(56) References Cited

U.S. PATENT DOCUMENTS

| | | | |
|---|---|---|---|
| 8,729,742 B2 | 5/2014 | Hua | |
| 8,766,324 B2 | 7/2014 | Lee | |
| 2003/0235019 A1* | 12/2003 | Ker | H01L 23/50 361/56 |
| 2008/0062597 A1* | 3/2008 | Chen | H01L 27/0251 361/56 |
| 2012/0331315 A1* | 12/2012 | Diab | G06F 1/266 713/310 |
| 2016/0027691 A1 | 1/2016 | Liu et al. | |
| 2016/0061895 A1 | 3/2016 | Pan et al. | |
| 2016/0195999 A1* | 7/2016 | Reynolds | G06F 3/044 345/174 |

* cited by examiner

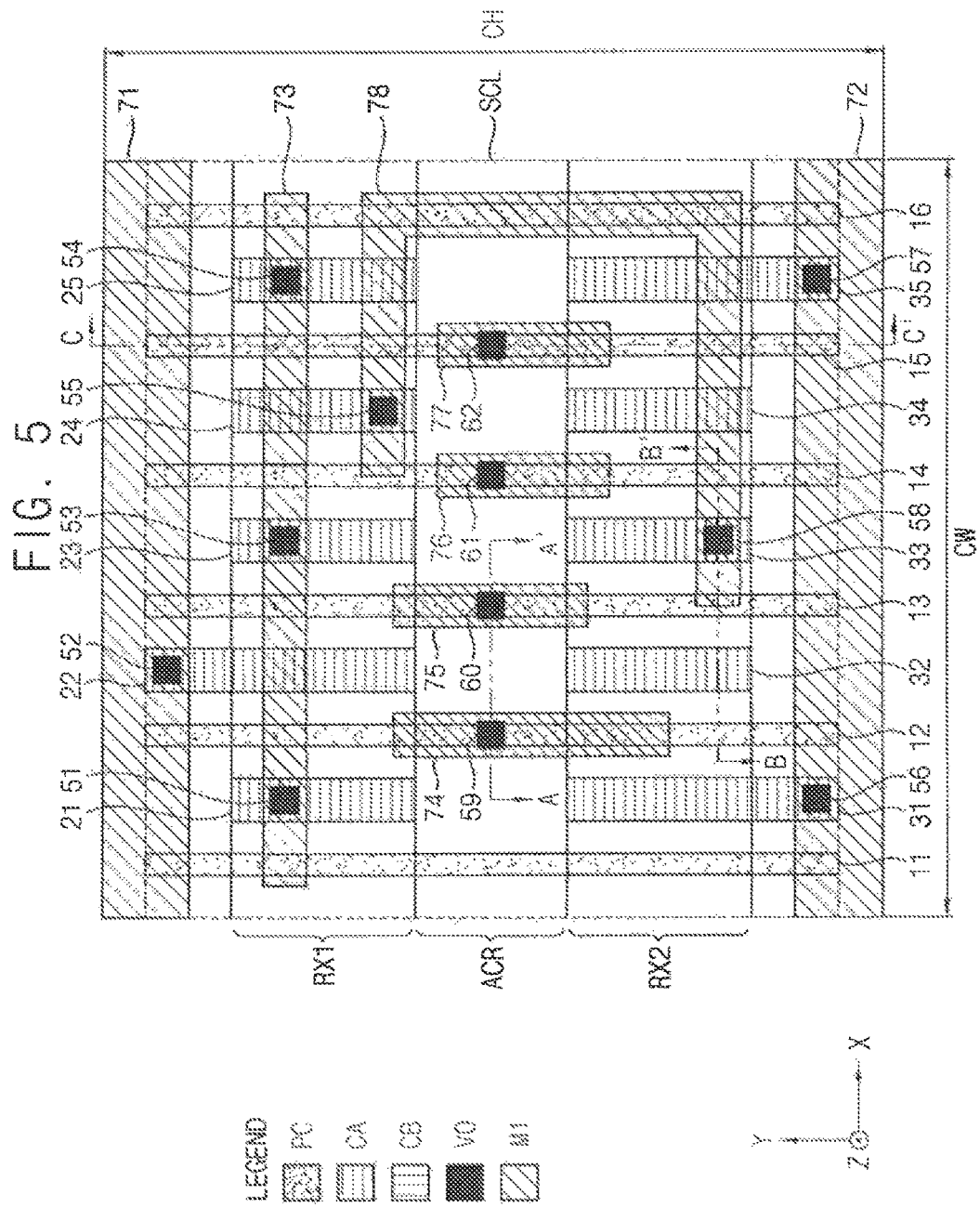

INTEGRATED CIRCUIT FOR REDUCING OHMIC DROP IN POWER RAILS

CROSS-REFERENCE TO RELATED APPLICATION

This U.S. Non-provisional application claims priority under 35 U.S.C. § 119 to Korean Patent Application No. 10-2016-0170757, filed on Dec. 14, 2016 in the Korean Intellectual Property Office (KIPO), the disclosure of which is incorporated by reference herein in its entirety.

TECHNICAL FIELD

Exemplary embodiments of the inventive concept relate generally to semiconductor integrated circuits, and more particularly, to an integrated circuit including a circuit chain for reducing ohmic drop in power rails

DISCUSSION OF THE RELATED ART

Standard cells may be used in the design of integrated circuits. Standard cells have predetermined architectures and information of the standard cells is stored in cell libraries. When designing integrated circuits, the standard cells are retrieved from the cell libraries and placed into desired locations on an integrated circuit layout. Routing is then performed to connect the standard cells with one another and with other cells. Power rails may be disposed to provide power to the standard cells. As ohmic drop or IR drop increases in the power rails, performance of the integrated circuit is degraded.

SUMMARY

According to an exemplary embodiment of the inventive concept, an integrated circuit includes a plurality of power rail pairs and a circuit chain. Each of the plurality of power rail pairs includes one of a plurality of high power rails configured to provide a first power supply voltage and one of a plurality of low power rails configured to provide a second power supply voltage that is lower than the first power supply voltage. The circuit chain includes a plurality of unit circuits that are cascade-connected such that an output of a previous unit circuit is provided as an input of a next unit circuit. The plurality of unit circuits are connected distributively to the plurality of power rail pairs.

According to an exemplary embodiment of the inventive concept, an integrated circuit includes a plurality of power rail pairs and a plurality of circuit chains. Each of the plurality of power rail pairs includes one of a plurality of high power rails configured to provide a first power supply voltage and one of a plurality of low power rails configured to provide a second power supply voltage that is lower than the first power supply voltage. Each of the plurality of circuit chains includes a plurality of unit circuits that are cascade-connected such that an output of a previous unit circuit is provided as an input of a next unit circuit. The plurality of unit circuits are connected distributively to the plurality of power rail pairs.

According to an exemplary embodiment of the inventive concept, an integrated circuit includes first through N-th power rail pairs and a circuit chain. The first through N-th power rail pairs include first through N-th high power rails, respectively, configured to provide a first power supply voltage and first through N-th low power rails, respectively, configured to provide a second power supply voltage that is lower than the first power supply voltage. The circuit chain includes first through N-th unit circuits that are cascade-connected such that an output of a previous unit circuit is provided as an input of a next unit circuit. The first through N-th unit circuits are connected to the first through N-th power rail pairs, respectively.

BRIEF DESCRIPTION OF THE DRAWINGS

The above and other features of the inventive concept will be more clearly understood by describing in detail exemplary embodiments thereof with reference to the accompanying drawings.

FIG. 5 is a diagram illustrating a layout of a standard cell according to an exemplary embodiment of the inventive concept.

DETAILED DESCRIPTION OF THE EMBODIMENTS

Figure 1:
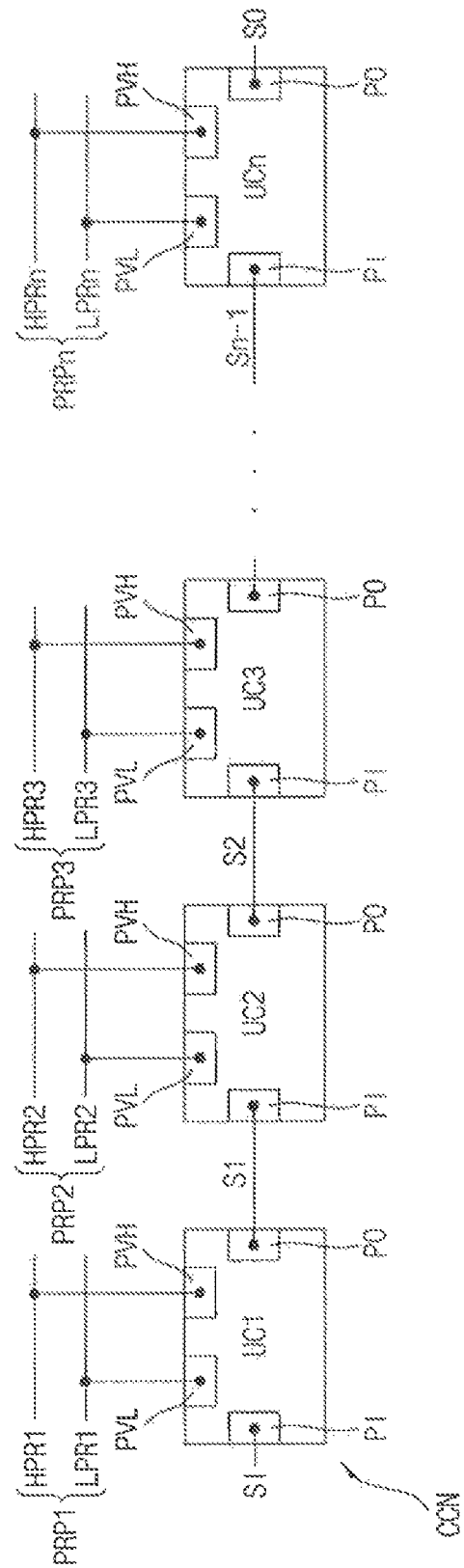
FIG. 1 is a diagram illustrating an integrated circuit according to an exemplary embodiment of the inventive concept.

Various exemplary embodiments of the inventive concept will be described more fully hereinafter with reference to the accompanying drawings. Like reference numerals may refer to like elements throughout this application.

Exemplary embodiments of the inventive concept may provide an integrated circuit capable of efficiently reducing ohmic drop in power rails.

Exemplary embodiments of the inventive concept may also provide a method of designing an integrated circuit capable of efficiently reducing ohmic drop in power rails.

FIG. 1 is a diagram illustrating an integrated circuit according to an exemplary embodiment of the inventive concept.

Referring to FIG. 1, an integrated circuit 200 includes a plurality of power rail pairs PRP1~PRPn and a circuit chain CCN.

The plurality of power rail pairs PRP1~PRPn includes a plurality of high power rails HPR1~HPRn, respectively, configured to provide a first power supply voltage VDD and a plurality of low power rails LPR1~LPRn, respectively, configured to provide a second power supply voltage VSS lower than the first power supply voltage VDD. For example, a first high power rail HPR1 and a first low power rail LPR1 may form a first power rail pair PRP1, a second high power rail HPR2 and a second low power rail LPR2 may form a second power rail pair PRP2, and an n-th high power rail HPRn and an n-th low power rail LPRn may form an n-th power rail pair PRPn.

The circuit chain CCN includes a plurality of unit circuits UC1~UCn that are cascade-connected. The cascade connection indicates that an output of a previous unit circuit is provided as an input of a next unit circuit. In other words, an output pin PO of a first unit circuit UC1 is connected to an input pin PI of a second unit circuit UC2 to provide a first signal S1 output from the first unit circuit UC1 as an input to the second unit circuit UC2, the output pin PO of a second unit circuit UC2 is connected to the input pin PI of a third unit circuit UC3 to provide a second signal S2 output from the second unit circuit UC2 as an input to the third unit circuit UC3, and the output pin PO of an (n−1)-th unit circuit UCn−1 is connected to the input pin PI of the n-th unit circuit UCn to provide an (n−1)-th signal Sn−1 output from the (n−1)-th unit circuit UCn−1 as an input to the n-th unit circuit UCn. Furthermore, each of the plurality of unit circuits UC1~UCn include pins PVH and PVL for receiving the first power supply voltage VDD and the second power supply voltage VSS, respectively.

An input signal SI of the circuit chain CCN may be applied to the input pin PI of the first unit circuit UC1 and an output signal SO of the circuit chain CCN may be provided at the output pin PO of the n-th unit circuit UCn. According to exemplary embodiments of the inventive concept, the output pin PO of the last unit circuit (e.g., the n-th unit circuit UCn) may be connected to the input pin PI of the first unit circuit UC1. In this case, the input signal SI is the same as the output signal SO and the circuit chain CCN may form a ring structure as will be described below with reference to FIGS. 13 through 15.

According to exemplary embodiments of the inventive concept, the plurality of unit circuits UC1~UCn are connected distributively to the plurality of power rail pairs PRP1~PRPn. With respect to all of the plurality of unit circuits UC1~UCn, two directly cascade-connected unit circuits are connected to two different power rail pairs, respectively, of the plurality of power rail pairs PRP1~PRPn.

For example, the first unit circuit UC1 and the second unit circuit UC2 that are directly cascade-connected are connected to the first power rail pair PRP1 and the second power rail pair PRP2, respectively. Similarly, the second unit circuit UC2 and the third unit circuit UC3 that are directly cascade-connected are connected to the second power rail pair PRP2 and the third power rail pair PRP3, respectively. The first unit circuit UC1 and the third unit circuit UC3 are not directly connected, and thus, the first power rail pair PRP1 may be the same as or different from the third power rail PRP3.

As such, the integrated circuit 200 according to exemplary embodiments of the inventive concept may reduce the ohmic drop in the power rails by connecting the cascade-connected unit circuits UC1~UCn of the circuit chain CCN distributively to the plurality of power rail pairs PRP1~PRPn.

Figure 2:
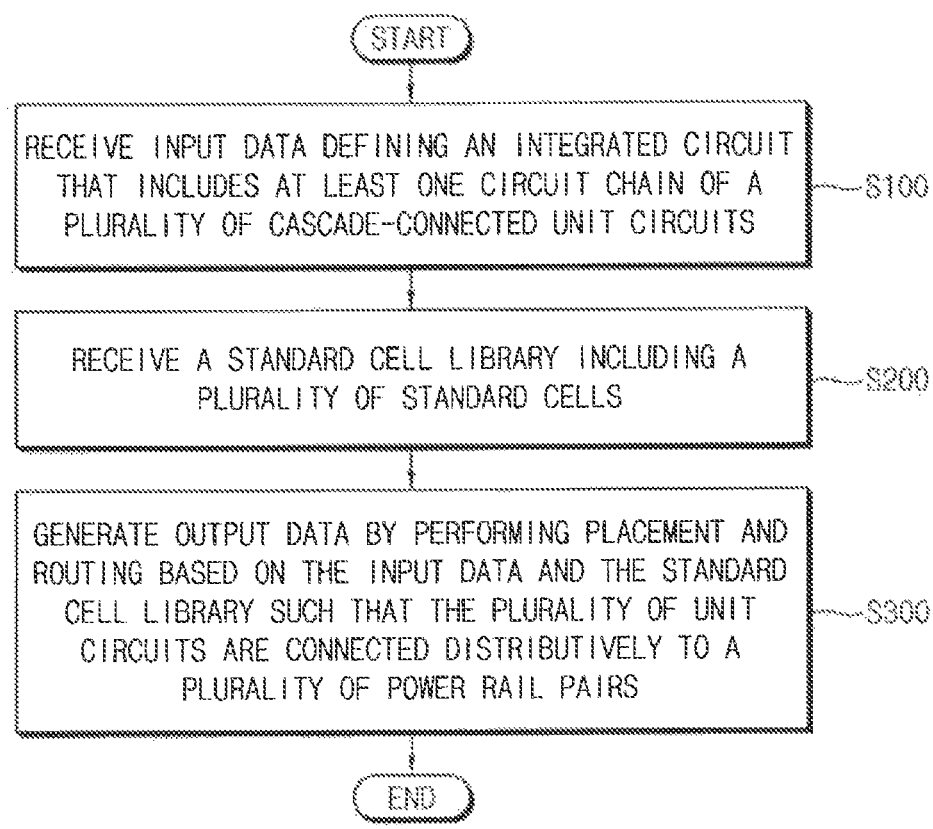
FIG. 2 is a flowchart illustrating a method of designing an integrated circuit according to an exemplary embodiment of the inventive concept.

FIG. 2 is a flowchart illustrating a method of designing an integrated circuit according to an exemplary embodiment of the inventive concept.

The method of FIG. 2 may be a method of designing a layout of an integrated circuit using a designing tool. According to exemplary embodiments of the inventive concept, the designing tool for designing the layout of the integrated circuit may be a program including a plurality of instructions that may be executed by a processor.

Referring to FIG. 2, input data defining an integrated circuit may be received where the integrated circuit includes at least one circuit chain of a plurality of cascade-connected unit circuits (S100). In general, an integrated circuit may be defined by a plurality of cells and the integrated circuit may be designed using a cell library including information of the plurality of cells. Hereinafter, the cell may be a standard cell and the cell library may be a standard cell library.

According to exemplary embodiments of the inventive concept, the input data may be data generated from an abstractive form with respect to behavior of the integrated circuit, for example, data defined in a register-transfer level (RTL), through synthesis using the standard cell library. For example, the input data may be a bitstream or a netlist that is generated by synthesizing the integrated circuit defined by a hardware description language (HDL), such as Very High Speed Integrated Circuit (VHSIC) hardware description language (VHDL) or Verilog.

According to exemplary embodiments of the inventive concept, the input data may be data for defining the layout of the integrated circuit, as described above. For example, the input data may include geometric information for defining a structure implemented as a semiconductor material, a metal, and an insulator. Layers of the integrated circuit indicated by the input data may have a layout of the cells and conducting wires used to connect a cell to other cells, for example.

The standard cell library including the plurality of standard cells may be received (S200). The term "standard cell" may refer to a unit of an integrated circuit in which a size of the layout meets a preset rule. The standard cell may include an input pin and an output pin and may process a signal received through the input pin to output a signal through the output pin. For example, the standard cell may correspond to a basic cell (such as an AND logic gate, an OR logic gate, a NOR logic gate, or an inverter), a complex cell (such as an OR/AND/INVERTER (OAI) or an AND/OR/INVERTER (AOI)), or a storage element (such as a master-slave flip flop or a latch).

The standard cell library may include information about the plurality of standard cells. For example, the standard cell library may include a name and a function of the standard cell, timing information, power information, and layout information. The standard cell library may be stored in a storage device and the standard cell library may be provided by accessing the storage device.

According to exemplary embodiments of the inventive concept, each of the unit circuits included in the circuit chain may correspond to a single standard cell. According to exemplary embodiments of the inventive concept, each of the unit circuits included in the circuit chain may correspond to a combination of two or more standard cells that may be homogeneous or heterogeneous.

Output data may be generated by performing placement and routing based on the input data and the standard cell library such that the plurality of unit circuits are connected distributively to a plurality of power rail pairs (S300). Examples of the distributive connection will be described below with reference to FIGS. 7 through 12.

According to exemplary embodiments of the inventive concept, when the received input data is data such as the bitstream or the netlist generated by synthesizing the integrated circuit, the output data may be the bitstream or the netlist. According to exemplary embodiments of the inventive concept, when the received input data is data defining the layout of the integrated circuit, for example, the data having a graphic data system II (GDSII) format, a format of the output data may also be data defining the layout of the integrated circuit.

According to exemplary embodiments of the inventive concept, ohmic drop in power rails may be reduced by connecting the cascade-connected unit circuits of the circuit chain distributively to the plurality of power rail pairs, and thus, performance of the integrated circuit may be enhanced.

Figure 3:
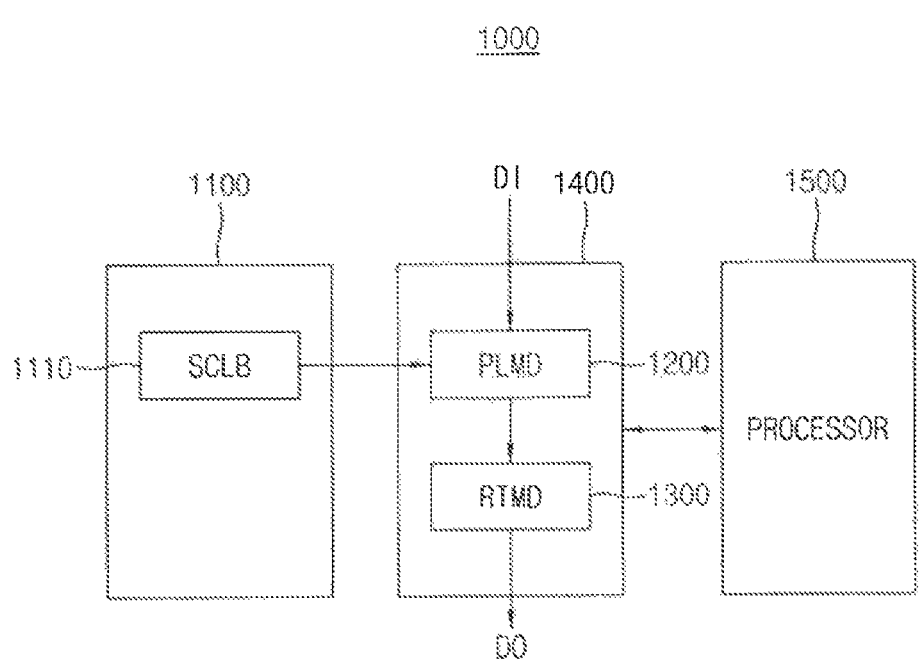
FIG. 3 is a block diagram illustrating a designing system of an integrated circuit according to an exemplary embodiment of the inventive concept.

FIG. 3 is a block diagram illustrating a designing system of an integrated circuit according to an exemplary embodiment of the inventive concept.

Referring to FIG. 3, a designing system 1000 may include a storage medium 1100, a designing module 1400, and a processor 1500.

The storage medium 1100 (e.g., a storage device) may store a standard cell library SCLB 1110. The standard cell library 1110 may be provided from the storage medium 1100 to the designing module 1400. The standard cell library 1110 may include a plurality of standard cells.

As described above, the standard cell may be a minimum unit for designing a block, a device, or a chip. According to exemplary embodiments of the inventive concept, each of the unit circuits included in the circuit chain may correspond to a single standard cell, or each of the unit circuits may correspond to a combination of two or more standard cells that may be homogeneous or heterogeneous.

The storage medium 1100 may include any computer-readable storage medium used to provide commands and/or data to a computer as a computer-readable storage medium. For example, the computer-readable storage medium 1100 may include volatile memory such as random access memory (RAM), read only memory (ROM), etc. and non-volatile memory such as flash memory, magnetoresistive RAM (MRAM), phase-change RAM (PRAM), resistive RAM (RRAM), etc. The computer-readable storage medium 1100 may be inserted into the computer, may be integrated in the computer, or may be coupled to the computer through a communication medium such as a network and/or a wireless link.

The designing module 1400 may include a placement module PLMD 1200 and a routing module RTMD 1300.

Herein, the term "module" may indicate, but is not limited to, a software and/or hardware component, such as a field programmable gate array (FPGA) or an application specific integrated circuit (ASIC), which performs certain tasks. A module may be configured to reside in a tangible, addressable storage medium and be configured to execute on one or more processors.

The placement module 1200 may, using the processor 1500, arrange standard cells based on input data DI defining the integrated circuit as well as the standard cell library 1110. The routing module 1300 may perform signal routing with respect to cell placement provided from the placement module 1200. If the routing is not successful, the placement module 1200 may modify the previous cell placement and the routing module 1300 may perform the signal routing with the modified cell placement. When the routing is successfully completed, the routing module 1300 may provide output data DO defining the integrated circuit.

The placement module 1200 and the routing module 1300 may be implemented by a single integrated designing module 1400 or may be implemented by separate and different modules. The integrated designing module 1400 including the placement module 1200 and the routing module 1300 may perform the placement and the routing such that the unit circuits of the circuit chain may be connected distributively to the plurality of power rail pairs.

The placement module 1200 and/or the routing module 1300 may be implemented in software, but the inventive concept is not limited thereto. If the placement module 1200 and the routing module 1300 are implemented in software, they may be stored in the storage medium 1100 as program codes or in other storage mediums.

The processor 1500 may be used when the designing module 1400 performs a computation. In FIG. 3, only one processor 1500 is illustrated, but the inventive concept is not limited thereto. For example, a plurality of processors may be included in the designing system 1000. In addition, the processor 1500 may include cache memories to increase computation capacity.

Hereinafter, structures of a cell and an integrated circuit including a plurality of cells are described using a first direction X, a second direction Y, and a third direction Z in a three-dimensional space. For example, the first direction X may be a row direction, the second direction Y may be a column direction, and the third direction Z may be a vertical direction.

Figure 4:
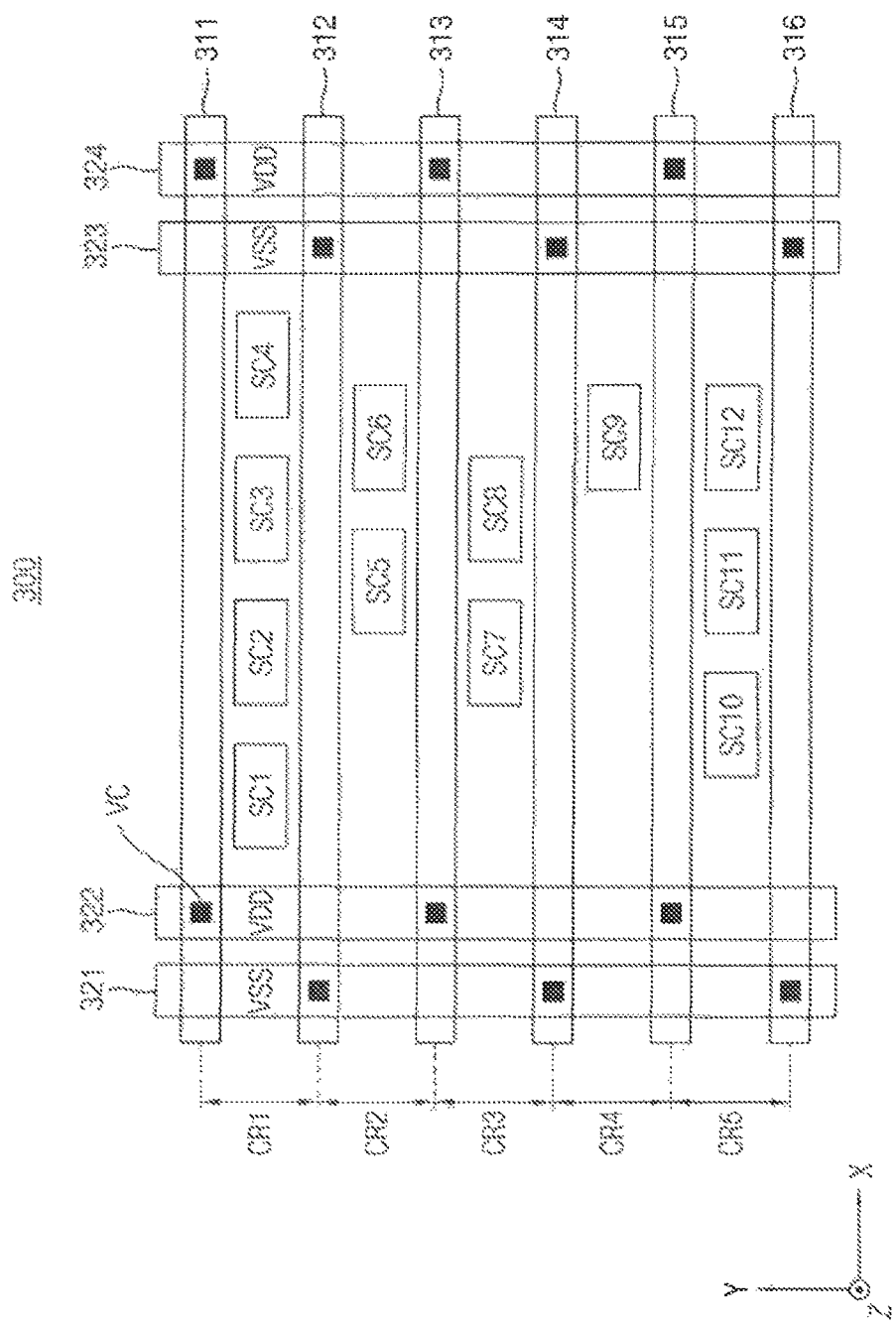
FIG. 4 is a diagram illustrating a layout of an integrated circuit according to an exemplary embodiment of the inventive concept.

FIG. 4 is a diagram illustrating a layout of an integrated circuit according to an exemplary embodiment of the inventive concept.

An integrated circuit 300 of FIG. 4 may be an application specific integrated circuit (ASIC). A layout of the integrated circuit 300 may be determined by performing the above-described placement and routing of standard cells SC1~SC12. Power may be provided to the standard cells SC1~SC12 through power rails 311~316. The power rails 311~316 may include high power rails 311, 313, and 315 configured to provide a first power supply voltage VDD and low power rails 312, 314, and 316 configured to provide a second power supply voltage VSS that is lower than the first power supply voltage VDD. For example, the first power supply voltage VDD may have a positive voltage level and the second power supply voltage VSS may have a ground level (e.g., 0V) or a negative voltage level.

The high power rails 311, 313, and 315 and the low power rails 312, 314, and 316 extend in the row direction X and be arranged alternatively one by one in the column direction Y to form boundaries of a plurality of circuit rows CR1~CR5 that is arranged in the column direction Y. The numbers of the power rails and the circuit rows are non-limiting examples and may be determined variously.

According to exemplary embodiments of the inventive concept, power may be distributed to the power rails 311~316 through power mesh routes 321~324 that extend in the column direction Y. Some power mesh routes 322 and 324 may provide the first power supply voltage VDD and other power mesh routes 321 and 323 may provide the second power supply voltage VSS. The power mesh routes 321~324 may be connected to the power rails 311~316 through vertical contacts VC such as via contacts.

In general, each of the circuit rows CR1~CR5 may be connected to two adjacent power rails that are disposed at boundaries thereof so as to be powered. For example, the standard cells SC1, SC2, SC3, and SC4 in the first circuit row CR1 may be connected to an adjacent and corresponding power rail pair including the high power rail 311 and the low power rail 312. According to exemplary embodiments of that inventive concept that will be described below with reference to FIGS. 8 and 9, at least one of the standard cells SC1, SC2, SC3, and SC4 may be connected to power rails other than the adjacent power rails 311 and 312.

Figure 6A:
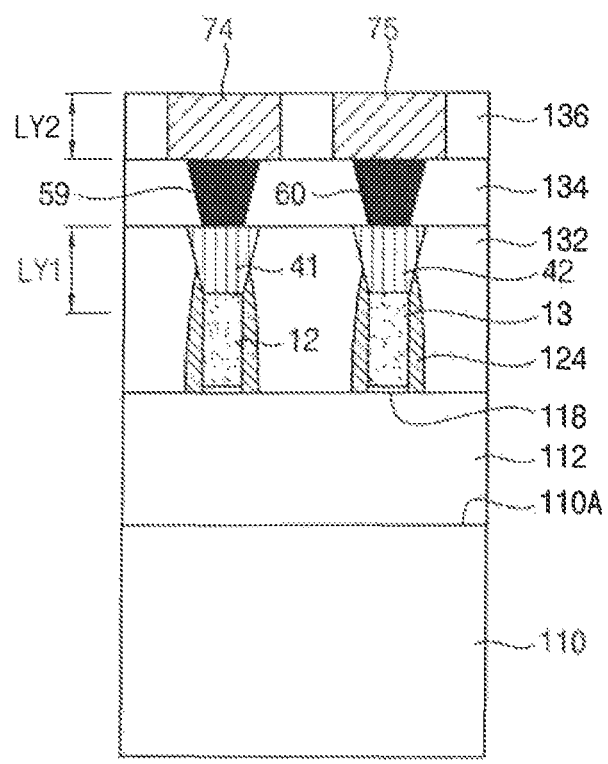
FIGS. 6A, 6B, and 6C are cross-sectional views of the standard cell of FIG. 5 according to an exemplary embodiment of the inventive concept.
Figure 6B:
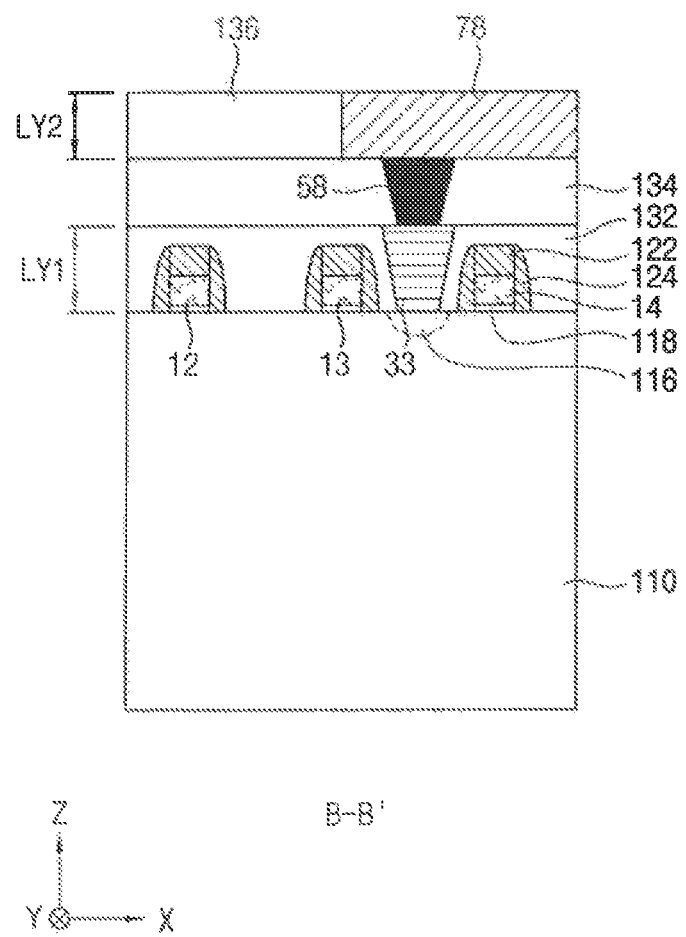
Figure 6C:
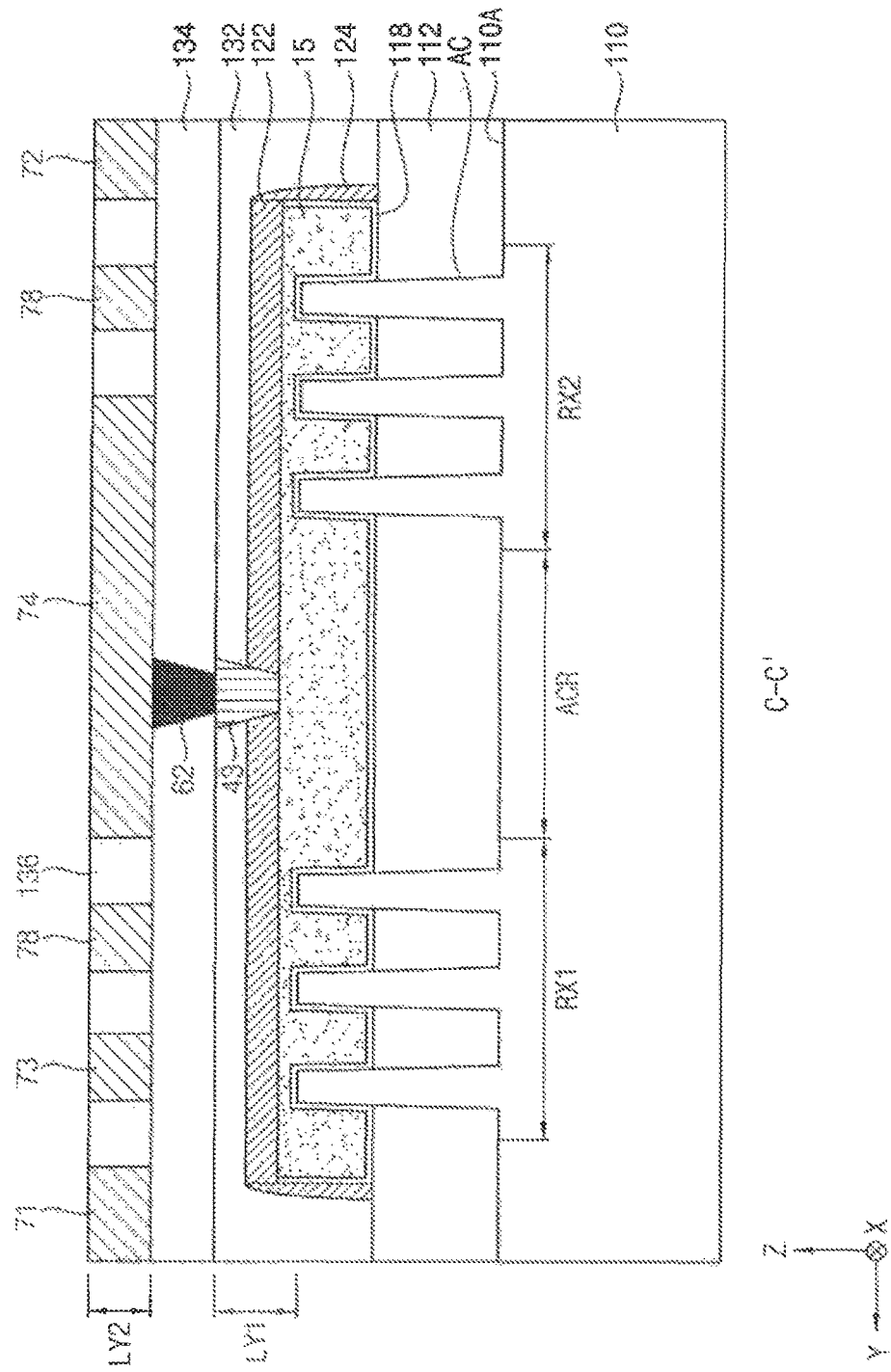

FIG. 5 is a diagram illustrating a layout of a standard cell according to an exemplary embodiment of the inventive concept, and FIGS. 6A, 6B, and 6C are cross-sectional views of the standard cell of FIG. 5 according to an exemplary embodiment of the inventive concept.

FIGS. 6A, 6B, and 6C illustrate a portion of a standard cell SCL that includes a fin field effect transistor (FinFET). FIG. 6A is a cross-sectional view of the standard cell SCL of FIG. 5 cut along a line A-A'. FIG. 6B is a cross-sectional view of the standard cell SCL of FIG. 5 cut along a line B-B'. FIG. 6C is a cross-sectional view of the standard cell SCL of FIG. 5 cut along a line C-C'.

Referring to FIGS. 5, 6A, 6B, and 6C, the standard cell SCL may be formed on a substrate 110 having an upper surface 110A that extends in a horizontal direction, e.g., the first direction X and the second direction Y.

According to exemplary embodiments of the inventive concept, the substrate 110 may include a semiconductor such as Si or Ge or a compound semiconductor such as SiGe, SiC, GaAs, InAs, or InP. According to exemplary embodiments of the inventive concept, the substrate 110 may have a silicon on insulator (SOI) structure. The substrate 110 may include a conductive area such as an impurity-doped well or an impurity-doped structure.

The standard cell SCL includes a first device area RX1, a second device area RX2, and an active cut area ACR separating the first and second device areas RX1 and RX2. In each of the first and second device areas RX1 and RX2, a plurality of fin-type active areas AC protruding from the substrate 110 may be formed.

The plurality of active areas AC are extended in parallel to one another in the first direction X. A device isolation layer 112 is formed between the plurality of active areas AC on the substrate 110. The plurality of active areas AC protrude from the device isolation layer 112 in the form of fins.

A plurality of gate insulation layers 118 and a plurality of gate lines PC 11, 12, 13, 14, 15, and 16 are formed on the substrate 110. The gate lines PC 11, 12, 13, 14, 15, and 16 are extended in the second direction Y crossing the plurality of active areas AC. The plurality of gate insulation layers 118 and the plurality of gate lines PC 11, 12, 13, 14, 15, and 16 are extended while covering an upper surface and two sidewalls of each of the active areas AC and an upper surface of the device isolation layer 112. A plurality of metal oxide semiconductor (MOS) transistors are formed along the plurality of gate lines PC 11, 12, 13, 14, 15, and 16. The MOS transistors may have a three-dimensional structure in which channels are formed in the upper surface and the two sidewalls of the active areas AC.

The gate insulation layers 118 may be formed of a silicon oxide layer, a high-k dielectric layer, or a combination thereof. The plurality of gate lines PC 11, 12, 13, 14, 15, and 16 are extended on the gate insulation layers 118 across the plurality of active areas AC while covering the upper surface and the two sidewalls of each of the active areas AC.

A mask 122 may be formed on each of the gate lines PC 11, 12, 13, 14, 15, and 16. Side walls of the insulation layer 118, the gate lines PC, and the mask 122 may be covered by a spacer 124. The gate lines PC 11, 12, 13, 14, 15, and 16 may have a structure in which a metal nitride layer, a metal layer, a conductive capping layer, and a gap-fill metal layer are sequentially stacked. The metal nitride layer and the metal layer may include Ti, Ta, W, Ru, Nb, Mo, or Hf. The metal layer and the metal nitride layer may be formed, for example, by using an atomic layer deposition (ALD) method, a metal organic ALD method, or a metal organic chemical vapor deposition (MOCVD) method. The conductive capping layer may function as a protection layer that prevents oxidization of a surface of the metal layer. In addition, the conductive capping layer may function as an adhesive layer (e.g., a wetting layer) that facilitates deposition of another conductive layer on the metal layer. The conductive capping layer may be formed of a metal nitride such as a TiN or TaN or a combination thereof, but is not limited thereto. The gap-fill metal layer may fill spaces between the active areas AC and extend on the conductive capping layer. The gap-fill metal layer may be formed of a W (e.g., tungsten) layer. The gap-fill metal layer may be formed, for example, by using an ALD method, a CVD method, or a physical vapor deposition (PVD) method.

A plurality of conductive contacts CA and CB are formed at a first layer LY1 on the active areas AC. The plurality of conductive contacts CA and CB includes a plurality of first contacts CA 21, 22, 23, 24, 25, 31, 32, 33, 34, and 35 connected to a source/drain area 116 of the active areas AC and a plurality of second contacts CB 41, 42, and 43 connected to the gate lines 11, 12, 13, 14, 15, and 16.

The plurality of conductive contacts CA and CB may be insulated from each other by a first interlayer insulation layer 132 that covers the active areas AC and the gate lines GL. The plurality of conductive contacts CA and CB may have an upper surface that is at substantially the same level as an upper surface of the first interlayer insulation layer 132. The first interlayer insulation layer 132 may be formed of a silicon oxide layer, but is not limited thereto.

A second interlayer insulation layer 134 and a plurality of lower via contacts V0 51, 52, 53, 54, 55, 56, 57, 58, 59, 60, 61, and 62 that pass through the second interlayer insulation layer 134 are formed on the first interlayer insulation layer 132. The second interlayer insulation layer 134 may be formed of a silicon oxide layer, but is not limited thereto.

A plurality of wirings M1 71, 72, 73, 74, 75, 76, 77, and 78 extending in the horizontal direction at a second layer LY2, which is higher than the first layer LY1, are formed on the second interlayer insulation layer 134.

Each of the wirings M1 may be connected to one of the plurality of conductive contacts CA and CB via one of the plurality of lower via contacts V0 formed between the first layer LY1 and the second layer LY2. Each of the plurality of lower via contacts V0 may be connected to one of the plurality of conductive contacts CA and CB, for example, by passing through the second interlayer insulation layer 134. The plurality of lower via contacts V0 may be insulated from one another by the second interlayer insulation layer 134.

The wirings 71~78 may include an internal connection wiring that electrically connects a plurality of areas in the standard cell SCL. For example, the internal connection wiring 78 may electrically connect the active area AC in the first device area RX1 and the active area AC in the second device area RX2 through the lower via contacts 55 and 58 and the first contacts 24 and 33.

Wirings 71 and 72 may correspond to a first power rail and second power rail, respectively. The first power rail 71 may be connected to the active area AC which is in the first device area RX1, and the second power rail 72 may be connected to the active area AC which is in the second device area RX2. One of the first and second power rails 71 and 72 may be a wiring for supplying a power supply voltage (e.g., the first power supply voltage VDD) and the other of the first and second power rails 71 and 72 may be a wiring for supplying a ground voltage (e.g., the second power supply voltage VSS).

The first power rail 71 and the second power rail 72 may extend in the first direction X in parallel to one another on the second layer LY2. According to exemplary embodiments of the inventive concept, the power rails 71 and 72 may be formed at substantially the same time with the other wirings 73~78. The wirings M1 may be formed to pass through a third interlayer insulation layer 136. The third interlayer insulation layer 136 may insulate the wirings M1 from one another.

A height CH of the standard cell SCL may refer to the distance along the second direction Y between the first power rail 71 and the second power rail 72. In addition, a width CW of the standard cell SCL may refer to a width along the first direction X that is parallel to the power rails 71 and 72.

The wirings M1 may have to meet limitations due to a minimum spacing rule. For example, the wirings M1 may have to meet limitations according to a "tip-to-side" restriction and a "corner rounding" restriction. The size and disposition of the wirings M1 may be limited by such restrictions.

The lower via contacts V0 and the wirings M1 may have a stacked structure of a barrier layer and a wiring conductive layer. The barrier layer may be formed, for example, of TiN, TaN, or a combination thereof. The wiring conductive layer may be formed, for example, of W, Cu, an alloy thereof, or a combination thereof. A CVD method, an ALD method, or an electroplating method may be used to form the wirings M1 and the lower via contacts V0.

As described above, each of the unit circuits included in the circuit chain may correspond to a single standard cell, or each of the unit circuits included in the circuit chain may correspond to a combination of two or more standard cells that may be homogeneous or heterogeneous.

FIGS. 7 through 12 are diagrams illustrating an integrated circuit including a circuit chain according to exemplary embodiments of the inventive concept.

Figure 7:
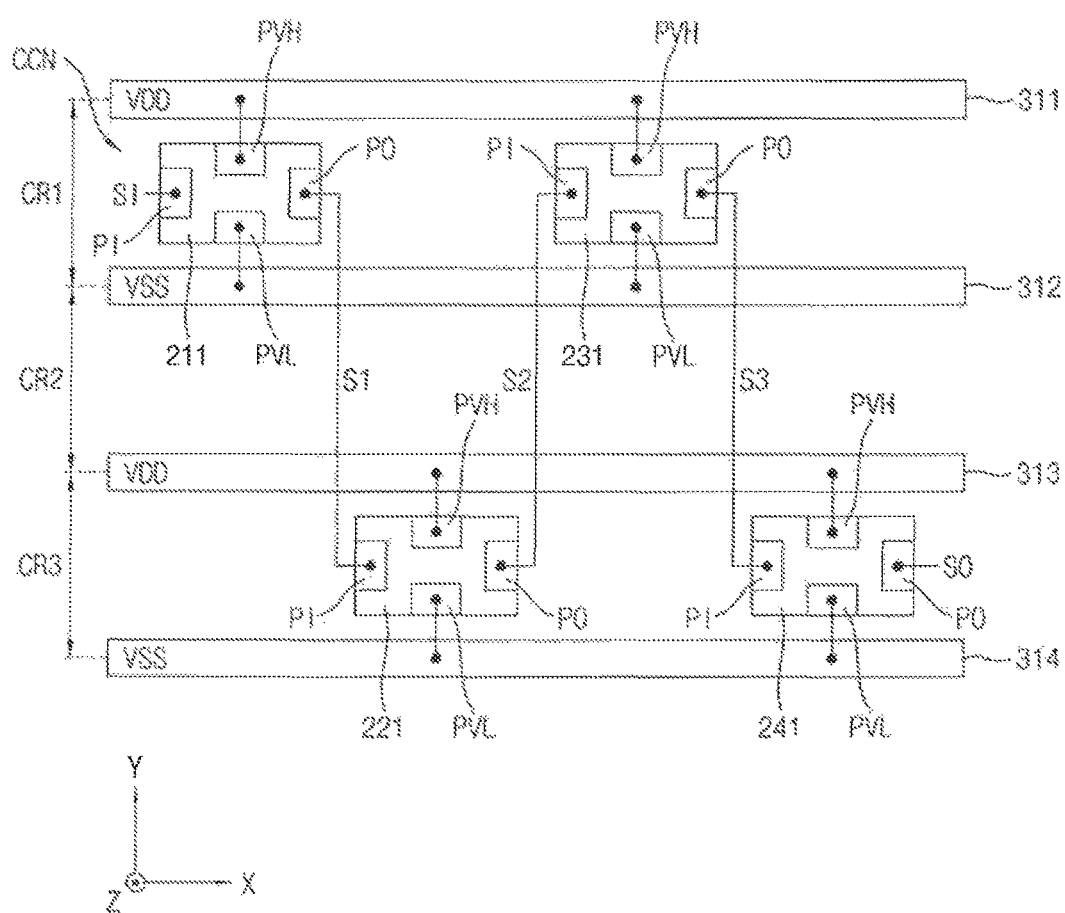
FIGS. 7 through 12 are diagrams illustrating an integrated circuit including a circuit chain according to exemplary embodiments of the inventive concept.

Referring to FIG. 7, an integrated circuit 201 includes the plurality of power rails 311, 312, 313, and 314 and the circuit chain CCN. The other circuits apart from the circuit chain CCN are omitted in FIG. 7 for convenience of illustration and description.

The power rails 311, 312, 313, and 314 may include high power rails 311 and 313 configured to provide the first power supply voltage VDD and low power rails 312 and 314 configured to provide the second power supply voltage VSS lower than the first power supply voltage VDD. One high power rail and one low power rail may form a pair to supply power to each unit circuit.

The high power rails 311 and 313 and the low power rails 312 and 314 extend in the row direction X in parallel to one another and are arranged alternatively one by one in the column direction Y to form boundaries of the plurality of circuit rows CR1, CR2, and CR3 that are arranged in the column direction Y.

The circuit chain CCN includes a plurality of unit circuits 211, 221, 231, and 241 that are cascade-connected. FIG. 7 illustrates four unit circuits as a non-limiting example but the number of unit circuits may be determined variously. As described above, the cascade connection indicates that an output of a previous unit circuit is provided as an input of a next unit circuit. In other words, the output pin PO of the first unit circuit 211 is connected to the input pin PI of the second unit circuit 221 to provide the first signal S1 output from the first unit circuit 211 as an input to the second unit circuit 221, the output pin PO of the second unit circuit 221 is connected to the input pin PI of the third unit circuit 231 to provide the second signal S2 output from the second unit circuit 221 as an input to the third unit circuit 231, and the output pin PO of the third unit circuit 231 is connected to the input pin PI of the fourth unit circuit 241 to provide the third signal S3 output from the third unit circuit 231 as an input to the fourth unit circuit 241.

The input signal SI of the circuit chain CCN may be applied to the input pin PI of the first unit circuit 211 and the output signal SO of the circuit chain CCN may be provided at the output pin PO of the fourth unit circuit 241. According to exemplary embodiments of the inventive concept, the output pin PO of the last unit circuit (e.g., the fourth unit circuit 241) may be connected to the input pin PI of the first unit circuit 211. In this case, the input signal SI is the same as the output signal SO and the circuit chain CCN may form a ring structure as will be described below with reference to FIGS. 13 through 15.

According to exemplary embodiments of the inventive concept, the plurality of unit circuits 211, 221, 231, and 241 are connected distributively to the plurality of power rail pairs, e.g., the first power rail pair 311 and 312 and the second power rail pair 313 and 314. With respect to all of the plurality of unit circuits 211, 221, 231, and 241, two directly cascade-connected unit circuits are connected to two different power rail pairs, respectively.

As illustrated in FIG. 7, each of the plurality of unit circuits 211, 221, 231, and 241 may be connected to a nearest high power rail of the high power rails 311 and 313 and a nearest low power rail of the low power rails 312 and 314. In other words, the directly cascade-connected first and second unit circuits 211 and 221 may be connected to the first power rail pair 311 and 312 and the second power rail pair 313 and 314, respectively. The directly cascade-connected second and third unit circuits 221 and 231 may be connected to the second power rail pair 313 and 314 and the first power rail pair 311 and 312, respectively. The directly cascade-connected third and fourth unit circuits 231 and 241 may be connected to the first power rail pair 311 and 312 and the second power rail pair 313 and 314, respectively.

As such, odd-numbered unit circuits 211 and 231 of the plurality of unit circuits 211, 221, 231, and 241 may be connected to the first power rail pair 311 and 312, and even-numbered unit circuits 221 and 241 of the plurality of unit circuits 211, 221, 231, and 241 may be connected to the second power rail pair 313 and 314.

Figure 8:
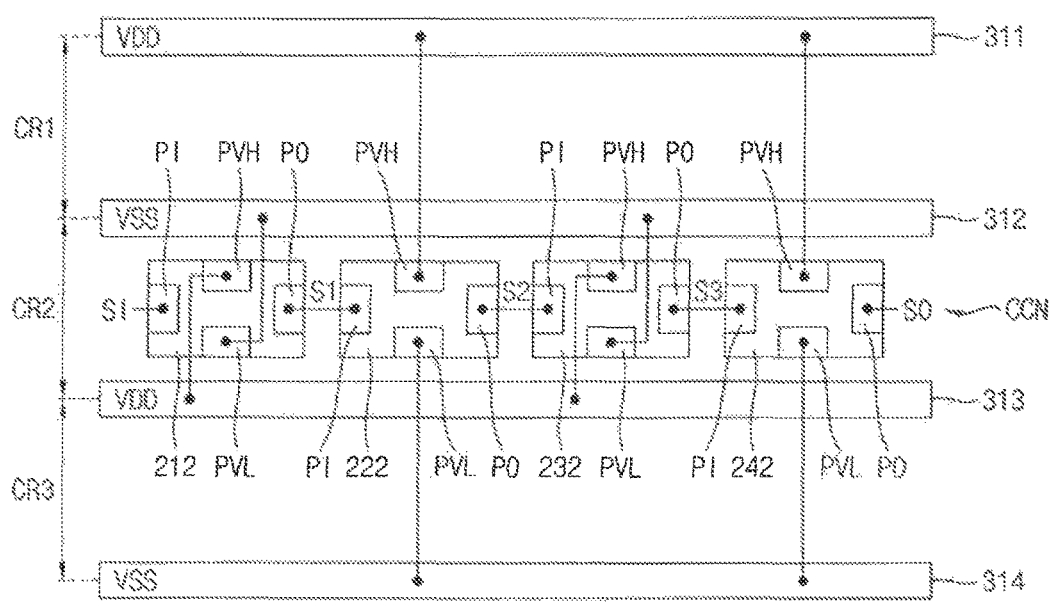

Referring to FIG. 8, an integrated circuit 202 includes the plurality of power rails 311, 312, 313, and 314 and the circuit chain CCN. The other circuits apart from the circuit chain CCN are omitted in FIG. 8 for convenience of illustration and description.

The power rails 311, 312, 313, and 314 may include high power rails 311 and 313 configured to provide the first power supply voltage VDD and low power rails 312 and 314 configured to provide the second power supply voltage VSS lower than the first power supply voltage VDD. One high power rail and one low power rail may form a pair to supply power to each unit circuit.

The high power rails 311 and 313 and the low power rails 312 and 314 extend in the row direction X in parallel to one another and are arranged alternatively one by one in the column direction Y to form boundaries of the plurality of circuit rows CR1, CR2, and CR3 that is arranged in the column direction Y.

The circuit chain CCN includes a plurality of unit circuits 212, 222, 232, and 242 that are cascade-connected. FIG. 8 illustrates four unit circuits as a non-limiting example but the number of unit circuits may be determined variously. As described above, the cascade connection indicates that an output of a previous unit circuit is provided as an input of a next unit circuit. In other words, the output pin PO of the first unit circuit 212 is connected to the input pin PI of the second unit circuit 222 to provide the first signal S1 output from the first unit circuit 212 as an input to the second unit circuit 222, the output pin PO of the second unit circuit 222 is connected to the input pin PI of the third unit circuit 232 to provide the second signal S2 output from the second unit circuit 222 as an input to the third unit circuit 232, and the output pin PO of the third unit circuit 232 is connected to the input pin PI of the fourth unit circuit 242 to provide the third signal S3 output from the third unit circuit 232 as an input to the fourth unit circuit 242.

The input signal SI of the circuit chain CCN may be applied to the input pin PI of the first unit circuit 212 and the output signal SO of the circuit chain CCN may be provided at the output pin PO of the fourth unit circuit 242. According to exemplary embodiments of the inventive concept, the output pin PO of the last unit circuit (e.g., the fourth unit circuit 242) may be connected to the input pin PI of the first unit circuit 212. In this case, the input signal SI is the same as the output signal SO and the circuit chain CCN may form a ring structure as will be described below with reference to FIGS. 13 through 15.

According to exemplary embodiments of the inventive concept, the plurality of unit circuits 212, 222, 232, and 242 are connected distributively to the plurality of power rail pairs, e.g., the first power rail pair 311 and 312 and the second power rail pair 313 and 314. Two directly cascade-connected unit circuits of the plurality of unit circuits 212, 222, 232, and 242 may be disposed adjacent to each other in a same circuit row of the plurality of circuit rows CR1~CR3. FIG. 8 illustrates an example where the four unit circuits 212, 222, 232, and 242 are disposed adjacent and sequentially in the row direction X in the second circuit row CR2.

As illustrated in FIG. 8, one of the two directly cascade-connected unit circuits may be connected to a nearest high power rail of the plurality of high power rails 311 and 313 and a nearest low power rail of the plurality of low power rails 312 and 314, and the other of the two directly cascade-connected unit circuits may be connected to a second nearest high power rail of the plurality of high power rails 311 and 313 and a second nearest low power rail of the plurality of low power rails 312 and 314. In other words, among the first and second unit circuits 212 and 222, the first unit circuit 212 is connected to the nearest power rails 312 and 313 and the second unit circuit 222 is connected to the second nearest power rails 311 and 314. Among the second and third unit circuits 222 and 232, the second unit circuit 222 is connected to the second nearest power rails 311 and 314 and the third unit circuit 232 is connected to the nearest power rails 312 and 313. Among the third and fourth unit circuits 232 and 242, the third unit circuit 232 is connected to the nearest power rails 312 and 313 and the fourth unit circuit 242 is connected to the second nearest power rails 311 and 314.

Figure 9:
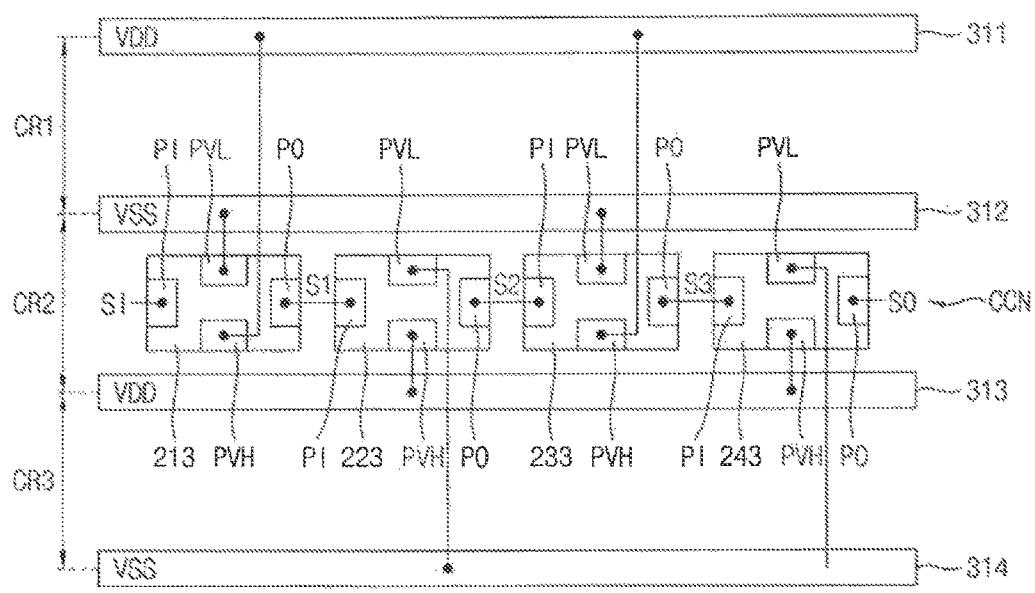

Referring to FIG. 9, an integrated circuit 203 includes the plurality of power rails 311, 312, 313, and 314, and the circuit chain CCN. The integrated circuit 203 of FIG. 9 is similar to the integrated circuit 202 of FIG. 8 and repeat descriptions are omitted.

According to exemplary embodiments of the inventive concept, a plurality of unit circuits 213, 223, 233, and 243 are connected distributively to the plurality of power rail pairs, e.g., the first power rail pair 311 and 312 and the second power rail pair 313 and 314. Two directly cascade-connected unit circuits of the plurality of unit circuits 213, 223, 233, and 243 may be disposed adjacent to each other in a same circuit row of the plurality of circuit rows CR1~CR3. FIG. 9 illustrates an example where the four unit circuits 213, 223, 233, and 243 are disposed adjacent and sequentially in the row direction X in the second circuit row CR2.

As illustrated in FIG. 9, one of the two directly cascade-connected unit circuits may be connected to a first power rail pair of the plurality of power rail pairs and the other circuit of the two directly cascade-connected unit circuits may be connected to a second power rail pair of the plurality of power rail pairs such that the two directly cascade-connected unit circuits are between the first power rail pair and the second power rail in the column direction Y. In other words, among the first and second unit circuits 213 and 223, the first unit circuit 213 is connected to the upper power rails 311 and 312 and the second unit circuit 223 is connected to the lower power rails 313 and 314. Among the second and third unit circuits 223 and 233, the second unit circuit 223 is connected to the lower power rails 313 and 314 and the third unit circuit 233 is connected to the upper power rails 311 and 312. Among the third and fourth unit circuits 233 and 243, the third unit circuit 233 is connected to the upper power rails 311 and 312 and the fourth unit circuit 243 is connected to the lower power rails 313 and 314.

Figure 10:
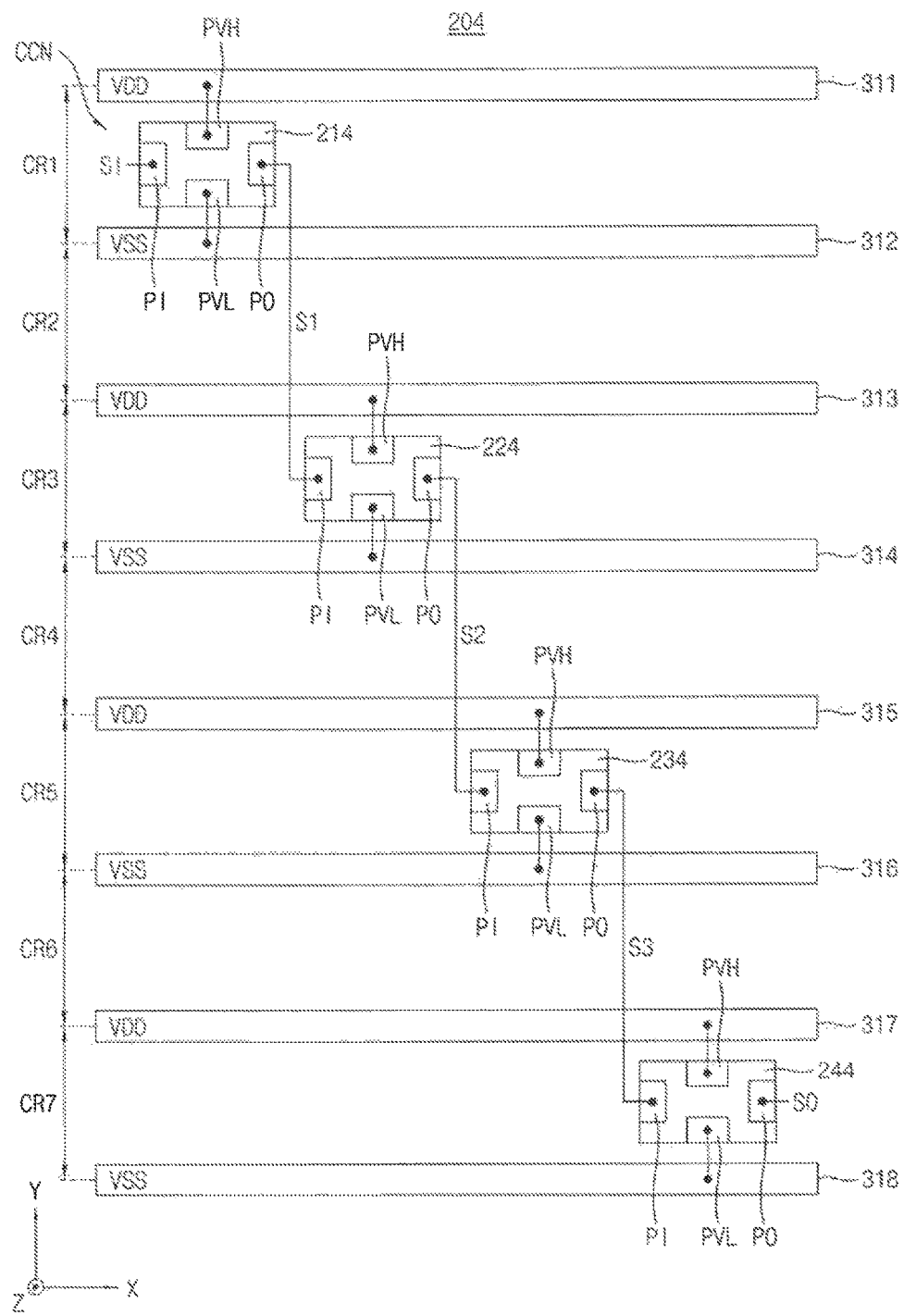

Referring to FIG. 10, an integrated circuit 204 includes a plurality of power rails 311~318 and the circuit chain CCN. The other circuits apart from the circuit chain CCN are omitted in FIG. 10 for convenience of illustration and description.

The power rails 311~318 may include high power rails 311, 313, 315, and 317 configured to provide the first power supply voltage VDD and low power rails 312, 314, 316, and 318 configured to provide the second power supply voltage VSS lower than the first power supply voltage VDD. One high power rail and one low power rail may form a pair to supply power to each unit circuit.

The high power rails 311, 313, 315, and 317 and the low power rails 312, 314, 316, and 318 extend in the row direction X in parallel to one another and are arranged alternatively one by one in the column direction Y to form boundaries of a plurality of circuit rows CR1~CR7 that are arranged in the column direction Y.

The circuit chain CCN includes a plurality of unit circuits 214, 224, 234, and 244 that are cascade-connected. FIG. 10 illustrates four unit circuits as a non-limiting example but the number of unit circuits may be determined variously. As described above, the cascade connection indicates that an output of a previous unit circuit is provided as an input of a next unit circuit. In other words, the output pin PO of the first unit circuit 214 is connected to the input pin PI of the second unit circuit 224 to provide the first signal S1 output from the first unit circuit 214 as an input to the second unit circuit 224, the output pin PO of the second unit circuit 224 is connected to the input pin PI of the third unit circuit 234 to provide the second signal S2 output from the second unit circuit 224 as an input to the third unit circuit 234, and the output pin PO of the third unit circuit 234 is connected to the input pin PI of the fourth unit circuit 244 to provide the third signal S3 output from the third unit circuit 234 as an input to the fourth unit circuit 244.

The input signal SI of the circuit chain CCN may be applied to the input pin PI of the first unit circuit 214 and the output signal SO of the circuit chain CCN may be provided at the output pin PO of the fourth unit circuit 244. According to exemplary embodiments of the inventive concept, the output pin PO of the last unit circuit (e.g., the fourth unit circuit 244) may be connected to the input pin PI of the first unit circuit 214. In this case, the input signal SI is the same as the output signal SO and the circuit chain CCN may form a ring structure as will be described below with reference to FIGS. 13 through 15.

According to exemplary embodiments of the inventive concept, the plurality of unit circuits 214, 224, 234, and 244 are connected distributively to the plurality of power rail pairs, e.g., the first power rail pair 311 and 312, the second power rail pair 313 and 314, a third power rail pair 315 and 316, and a fourth power rail pair 317 and 318. Each of the plurality of unit circuits 214, 224, 234, and 244 may be connected to a nearest high power rail of the plurality of high power rails 311, 313, 315, and 317 and a nearest low power rail of the plurality of low power rails 312, 314, 316, and 318.

In FIG. 7, the unit circuits 211, 221, 231, and 241 in the integrated circuit 201 of are disposed distributively in the two circuit rows CR1 and CR3 and connected distributively to the first power rail pair 311 and 312 and the second power rail pair 313 and 314. In contrast, in FIG. 10, the unit circuits 214, 224, 234, and 244 in the integrated circuit 204 are disposed distributively in the four circuit rows CR1, CR3, CR5, and CR7 and connected distributively to the first power rail pair 311 and 312, the second power rail pair 313 and 314, the third power rail pair 315 and 316, and the fourth power rail pair 317 and 318. In other words, for the same number of unit circuits, as the number of power rail pairs is increased, the ohmic drop in the power rails may be reduced because an operation current flowing at each power rail pair may be decreased.

Figure 11:
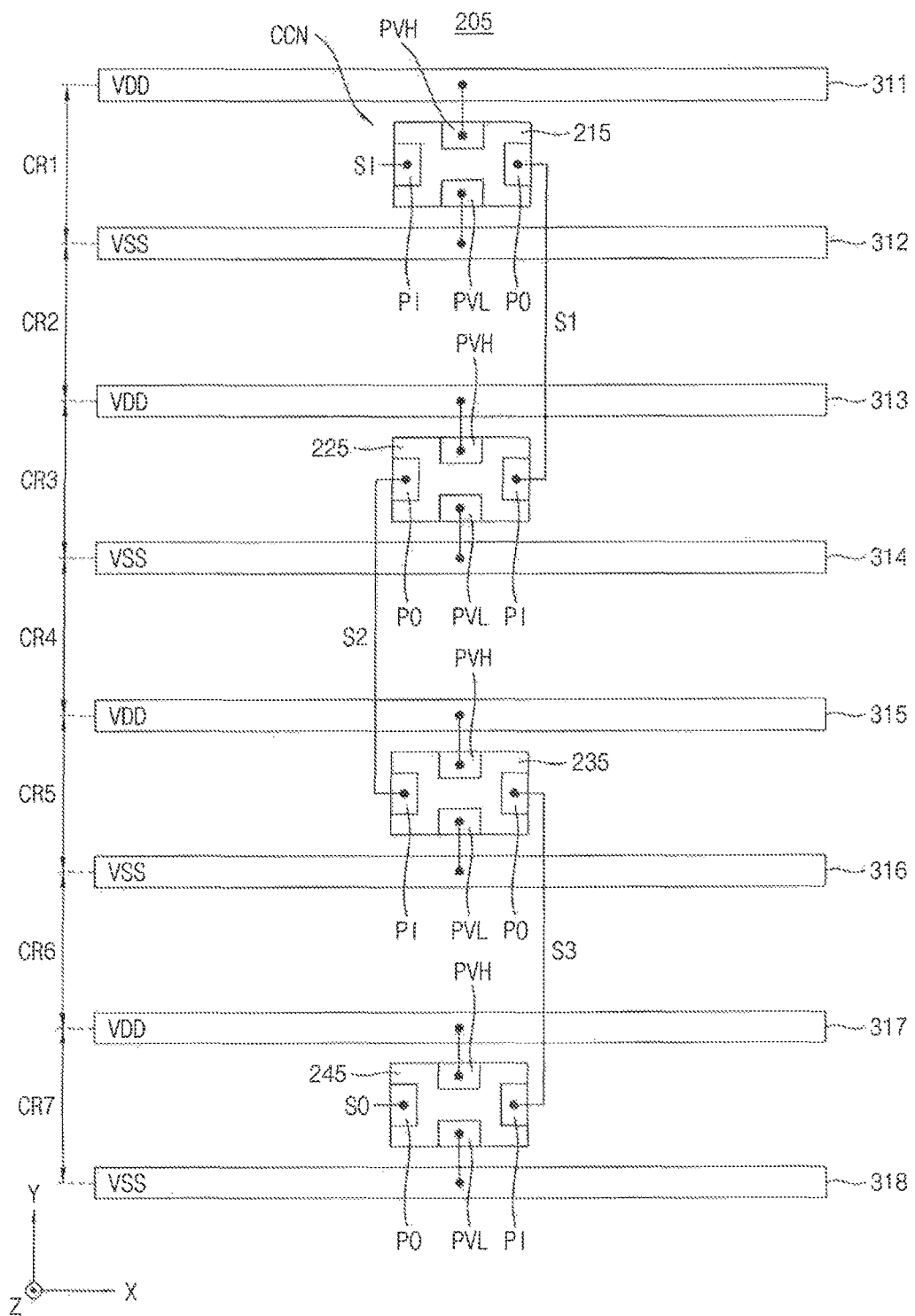

Referring to FIG. 11, an integrated circuit 205 includes the plurality of power rails 311~318 and the circuit chain CCN. The other circuits apart from the circuit chain CCN are omitted in FIG. 11 for convenience of illustration and description.

The power rails 311~318 may include high power rails 311, 313, 315, and 317 configured to provide the first power supply voltage VDD and low power rails 312, 314, 316, and 318 configured to provide the second power supply voltage VSS lower than the first power supply voltage VDD. One high power rail and one low power rail may form a pair to supply power to each unit circuit.

The high power rails 311, 313, 315, and 317 and the low power rails 312, 314, 316, and 318 extend in the row direction X in parallel to one another and are arranged alternatively one by one in the column direction Y to form boundaries of the plurality of circuit rows CR1~CR7 that are arranged in the column direction Y.

The circuit chain CCN includes a plurality of unit circuits 215, 225, 235, and 245 that are cascade-connected. FIG. 11 illustrates four unit circuits as a non-limiting example but the number of unit circuits may be determined variously. As described above, the cascade connection indicates that an output of a previous unit circuit is provided as an input of a next unit circuit. In other words, the output pin PO of the first unit circuit 215 is connected to the input pin PI of the second unit circuit 225 to provide the first signal S1 output from the first unit circuit 215 as an input to the second unit circuit 225, the output pin PO of the second unit circuit 225 is connected to the input pin PI of the third unit circuit 235 to provide the second signal S2 output from the second unit circuit 225 as an input to the third unit circuit 235, and the output pin PO of the third unit circuit 235 is connected to the input pin PI of the fourth unit circuit 245 to provide the third signal S3 output from the third unit circuit 235 as an input to the fourth unit circuit 245.

The input signal SI of the circuit chain CCN may be applied to the input pin PI of the first unit circuit 215 and the output signal SO of the circuit chain CCN may be provided at the output pin PO of the fourth unit circuit 245. According to exemplary embodiments of the inventive concept, the output pin PO of the last unit circuit (e.g., the fourth unit circuit 245) may be connected to the input pin PI of the first unit circuit 215. In this case, the input signal SI is the same as the output signal SO and the circuit chain CCN may form a ring structure as will be described below with reference to FIGS. 13 through 15.

According to exemplary embodiments of the inventive concept, the plurality of unit circuits 215, 225, 235, and 245 are connected distributively to the plurality of power rail pairs, e.g., the first power rail pair 311 and 312, the second power rail pair 313 and 314, the third power rail pair 315 and 316, and the fourth power rail pair 317 and 318. Each of the plurality of unit circuits 215, 225, 235, and 245 may be connected to a nearest high power rail of the plurality of high power rails 311, 313, 315, and 317 and a nearest low power rail of the plurality of low power rails 312, 314, 316, and 318.

In FIG. 10, the unit circuits 214, 224, 234, and 244 in the integrated circuit 204 are arranged in a diagonal direction. In contrast, in FIG. 11, the unit circuits 215, 225, 235, and 245 in the integrated circuit 205 are arranged in the column direction Y. An optimal layout may be selected among various layouts as illustrated in FIGS. 10 and 11 depending on the designing margin of the other circuits in the integrated circuit.

In FIG. 11, the positions of the input and output pins PI and PO of the first and third unit circuits 215 and 235 are symmetric (e.g., in line) with those of the second and fourth unit circuits 225 and 245, respectively. Using such a symmetric structure, wirings connecting the unit circuits may be routed efficiently.

Figure 12:
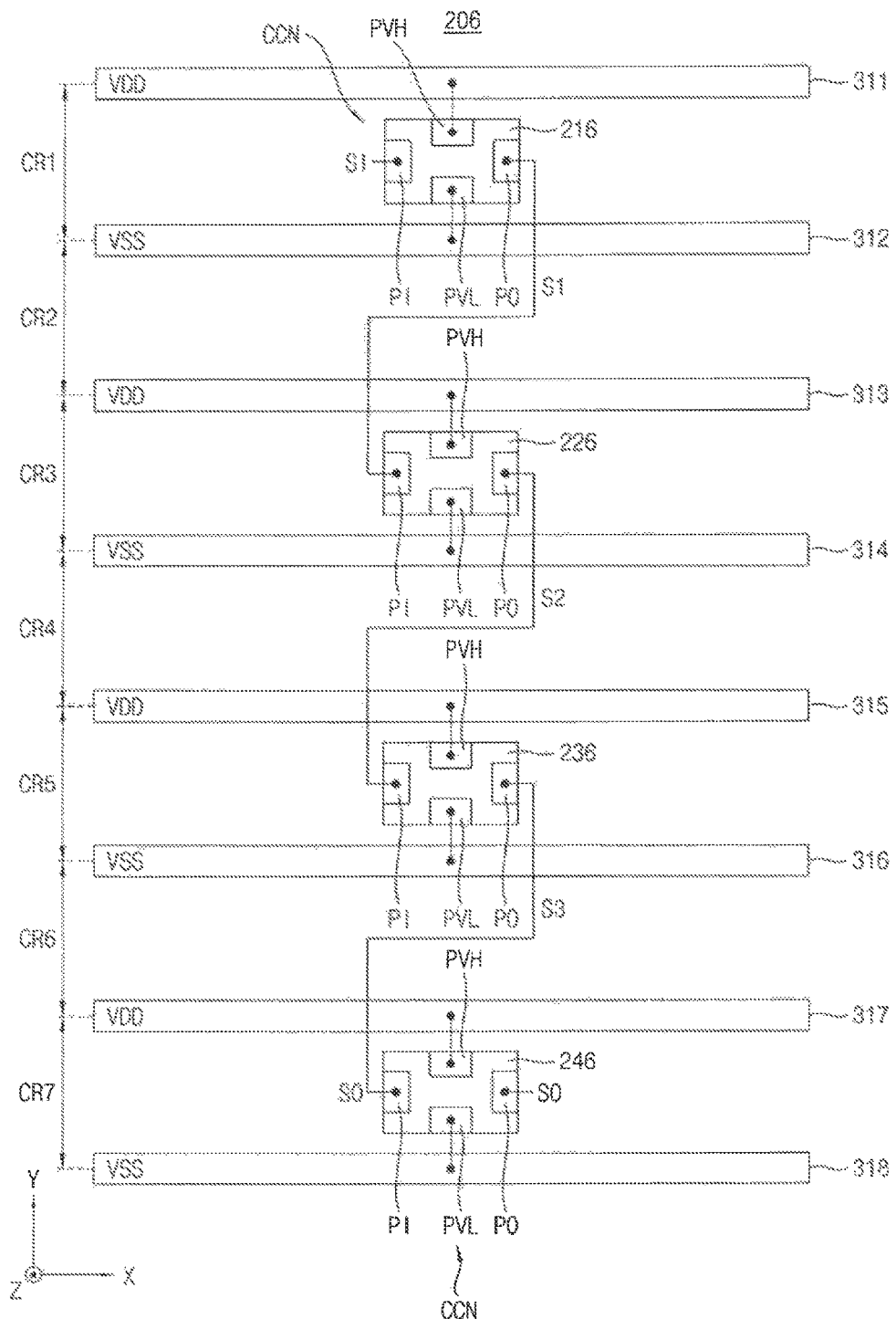

Referring to FIG. 12, an integrated circuit 206 includes the plurality of power rails 311~318 and the circuit chain CCN. The circuit chain CCN includes a plurality of unit circuits 216, 226, 236, and 246 that are cascade-connected. The integrated circuit 206 of FIG. 12 is similar to the integrated circuit 205 of FIG. 11 and repeat descriptions are omitted.

In FIG. 11, the first unit circuit 215 and the third unit circuit 235 have a lateral symmetric structure in comparison with the second unit circuit 225 and the fourth unit circuit 245, respectively. In contrast, the first through fourth unit circuits 216, 226, 236, and 246 in FIG. 12 have substantially the same structure. An optimal layout may be selected among various layouts as illustrated in FIGS. 10, 11, and 12 depending on the designing margin of the other circuits in the integrated circuit.

Figure 13:
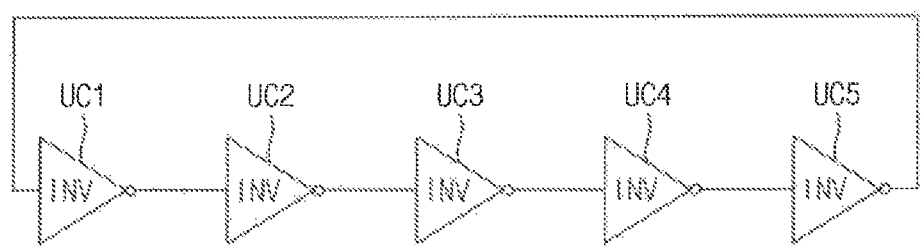
FIG. 13 is a diagram illustrating a circuit chain included in an integrated circuit according to an exemplary embodiment of the inventive concept.

FIG. 13 is a diagram illustrating a circuit chain included in an integrated circuit according to an exemplary embodiment of the inventive concept.

Referring to FIG. 13, a circuit chain CCNa may include a plurality of unit circuits UC1~UC5 that are cascade-connected. FIG. 13 illustrates five unit circuits as a non-limiting example but the number of unit circuits may be determined variously. The circuit chain CCNa may be a ring oscillator such that the output of a last unit circuit (e.g., UC5) is provided as the input of a first unit circuit (e.g., UC1). As illustrated in FIG. 13, the circuit chain CCNa may be a single-ended ring oscillator such that the plurality of unit circuits UC1~UC5 are implemented with inverters INV. According to exemplary embodiments of the inventive concept, the first unit circuit UC1 may be replaced with a NAND logic gate that receives an enable signal and the output of the last unit circuit UC5.

Figure 14A:
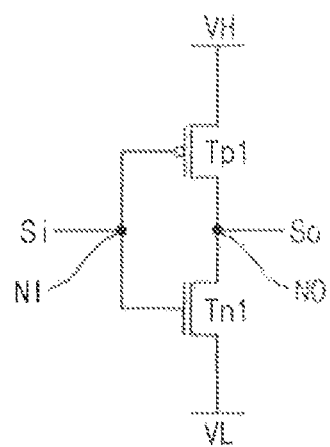
FIG. 14A and FIG. 14B are diagrams illustrating a unit circuit included in the circuit chain of FIG. 13 according to exemplary embodiments of the inventive concept.
Figure 14B:
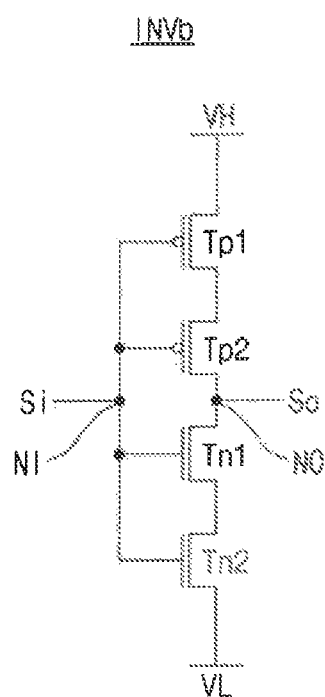

FIG. 14A and FIG. 14B are diagrams illustrating a unit circuit included in the circuit chain of FIG. 13 according to exemplary embodiments of the inventive concept.

FIG. 14A illustrates an example of a single-stack inverter INVa that is disposed between an input node NI receiving an input signal S1 and an output node NO outputting an output signal So. FIG. 14B illustrates an example of a multi-stack inverter INVb that is disposed between the input node NI and the output node NO. The single-stack is a structure where one P-type transistor Tp1 and one N-type transistor Tn1 are connected between a first voltage VH and a second voltage VL. In contrast, the multi-stack is a structure where at least one of the number of P-type transistors Tp1 and Tp2 and the number of N-type transistors Tn1 and Tn2, connected between the first voltage VH and the second voltage VL, is greater than one. The multi-stack inverter may have a larger delay amount than the single-stack inverter. FIGS. 14A and 14B illustrate the inverters as non-limiting examples and the circuit chain CCNa (e.g., the single-ended ring oscillator) of FIG. 13 may implemented with inverters of various configurations.

The output signal So may be delayed and inverted in comparison with the input signal Si if an odd number of inverters are connected in series between the input node NI and an intermediate node NA. In contrast, the output signal So may be delayed without inversion in comparison with the input signal SI if an even number of inverters are connected in series between the input node NI and the intermediate node NA. The even number of inverters may be referred to as a buffer.

Figure 15:
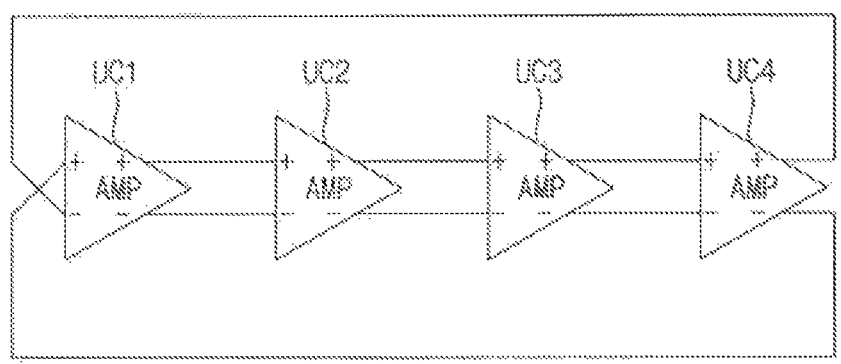
FIG. 15 is a diagram illustrating a circuit chain included in an integrated circuit according to an exemplary embodiment of the inventive concept.

FIG. 15 is a diagram illustrating a circuit chain included in an integrated circuit according to an exemplary embodiment of the inventive concept.

Referring to FIG. 15, a circuit chain CCNb may include the plurality of unit circuits UC1~UC4 that are cascade-connected. FIG. 15 illustrates four unit circuits as a non-limiting example but the number of unit circuits may be determined variously. The circuit chain CCNb may be a ring oscillator such that the output of a last unit circuit (e.g., UC4) is provided as the input of a first unit circuit (e.g., UC1). As illustrated in FIG. 15, the circuit chain CCNb may be a differential oscillator such that the plurality of unit circuits UC1~UC4 are implemented with differential amplifiers AMP.

Figure 16A:
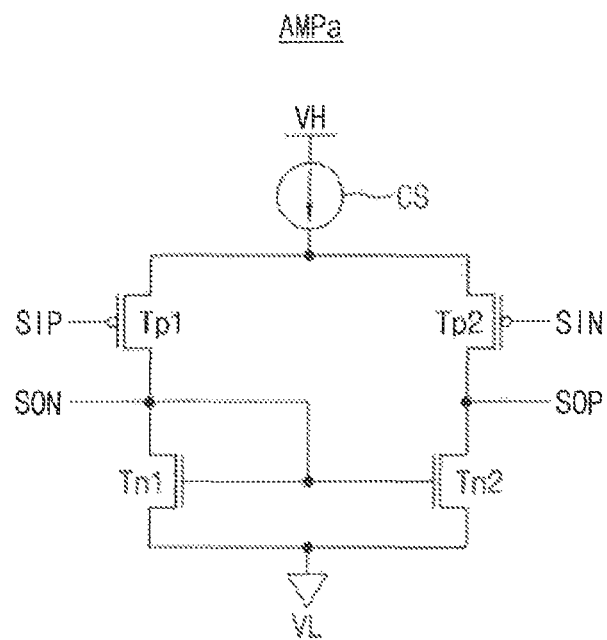
FIG. 16A and FIG. 16B are diagrams illustrating a unit circuit included in the circuit chain of FIG. 15 according to exemplary embodiments of the inventive concept.
Figure 16B:
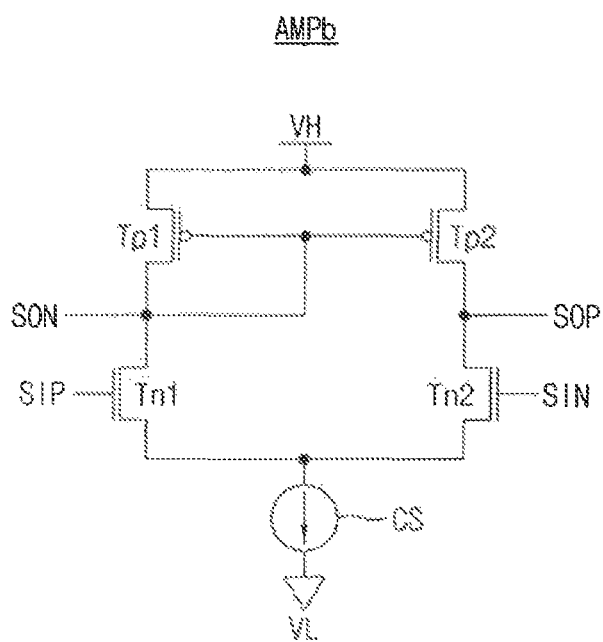

FIG. 16A and FIG. 16B are diagrams illustrating a unit circuit included in the circuit chain of FIG. 15 according to exemplary embodiments of the inventive concept.

FIG. 16A illustrates a P-type differential amplifier AMPa and FIG. 16B illustrates an N-type differential amplifier AMPb. The P-type differential amplifier AMPa may include a current source CS, P-type input transistors Tp1 and Tp2 receiving an input signal pair SIP and SIN, and N-type load transistors Tn1 and Tn2, which are connected between the first voltage VH and the second voltage VL. The N-type differential amplifier AMPb may include P-type load transistors Tp1 and Tp2, N-type input transistors Tn1 and Tn2 receiving the input signal pair SIP and SIN, and the current source CS, which are connected between the first voltage VH and the second voltage VL. An output signal pair SOP and SON may be output through nodes between the input transistors and the load transistors. The configurations of FIGS. 16A and 16B are non-limiting examples and the circuit chain CCNb (e.g., the differential ring oscillator) of FIG. 15 may be implemented with differential amplifiers of various configurations.

Figure 17:
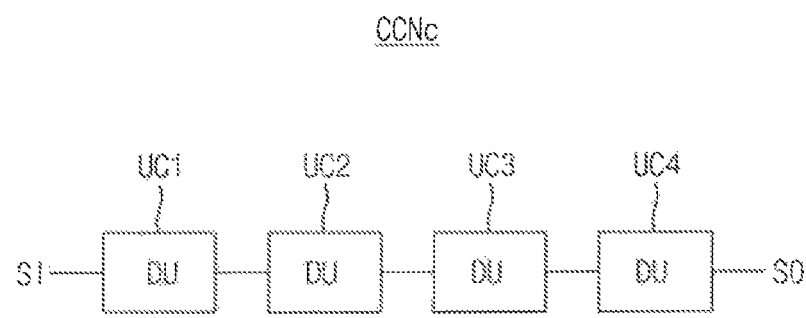
FIG. 17 is a diagram illustrating a circuit chain included in an integrated circuit according to an exemplary embodiment of the inventive concept.

FIG. 17 is a diagram illustrating a circuit chain included in an integrated circuit according to an exemplary embodiment of the inventive concept.

Referring to FIG. 17, a circuit chain CCNc may include the plurality of unit circuits UC1~UC4 that are cascade-connected. FIG. 17 illustrates four unit circuits as a non-limiting example but the number of unit circuits may be determined variously. As illustrated in FIG. 17, the circuit chain CCNc may be a delay circuit such that the plurality of unit circuits UC1~UC4 are implemented with unit delay circuits DU each having a unit delay amount. The output signal SO of the delay circuit CCNc may be delayed by the unit delay amount multiplied by the number of unit circuits, relative to the input signal SI.

Figure 18:
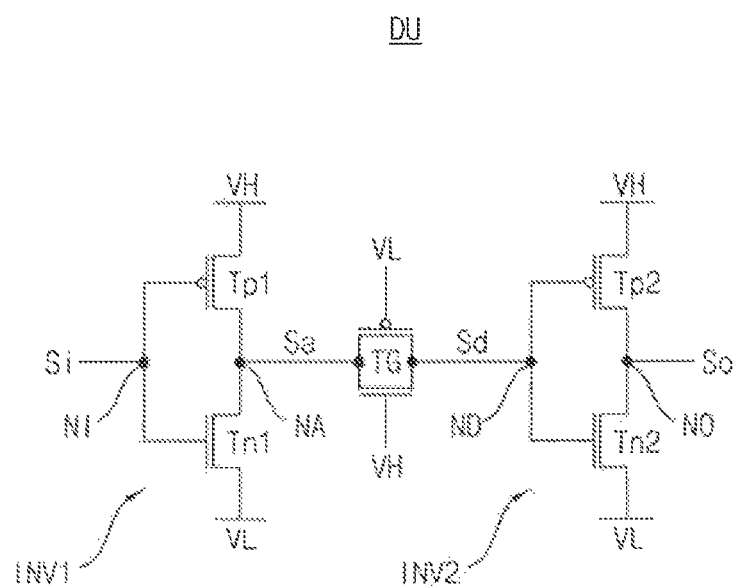
FIG. 18 is a diagram illustrating a unit circuit included in the circuit chain of FIG. 17 according to an exemplary embodiment of the inventive concept.

FIG. 18 is a diagram illustrating a unit circuit included in the circuit chain of FIG. 17 according to an exemplary embodiment of the inventive concept.

Referring to FIG. 18, the delay circuit DU may include a first inverter INV1, a transmission gate TG, and a second inverter INV2. The first inverter INV1 may include the P-type transistor Tp1 connected between the first voltage VH and the intermediate node NA, and the N-type transistor Tn1 connected between the intermediate node NA and the second voltage VL. Gate electrodes of the transistors Tp1 and Tn1 may be connected to the input node NI. The first inverter INV1 may be connected between the input node NI and the intermediate node NA. The first inverter INV1 may invert and amplify the input signal S1 received through the input node NI to generate an intermediate signal Sa through the intermediate node NA. The second inverter INV2 may include the P-type transistor Tp2 connected between the first voltage VH and the output node NO, and the N-type transistor Tn2 connected between the output node NO and the second voltage VL. Gate electrodes of the transistors Tp2 and Tn2 may be connected to a delay node ND. The second inverter INV2 may be connected between the delay node ND and the output node NO. The second inverter INV2 may invert and amplify a delay signal Sd received through the delay node ND to generate the output signal So through the output node NO.

The transmission gate TG may be connected between the intermediate node NA and the delay node ND. The first voltage VH and the second voltage VL may be fixed. For example, the second voltage VL is applied to a P-type gate electrode of the transmission gate TG, and the first voltage VH is applied to an N-type gate electrode of the transmission gate TG in the delay circuit DU of FIG. 18. The configuration of FIG. 18 is a non-limiting example and the circuit chain CCNc (e.g., the delay circuit) of FIG. 17 may be implemented with unit delay circuits of various configurations.

Figure 19:
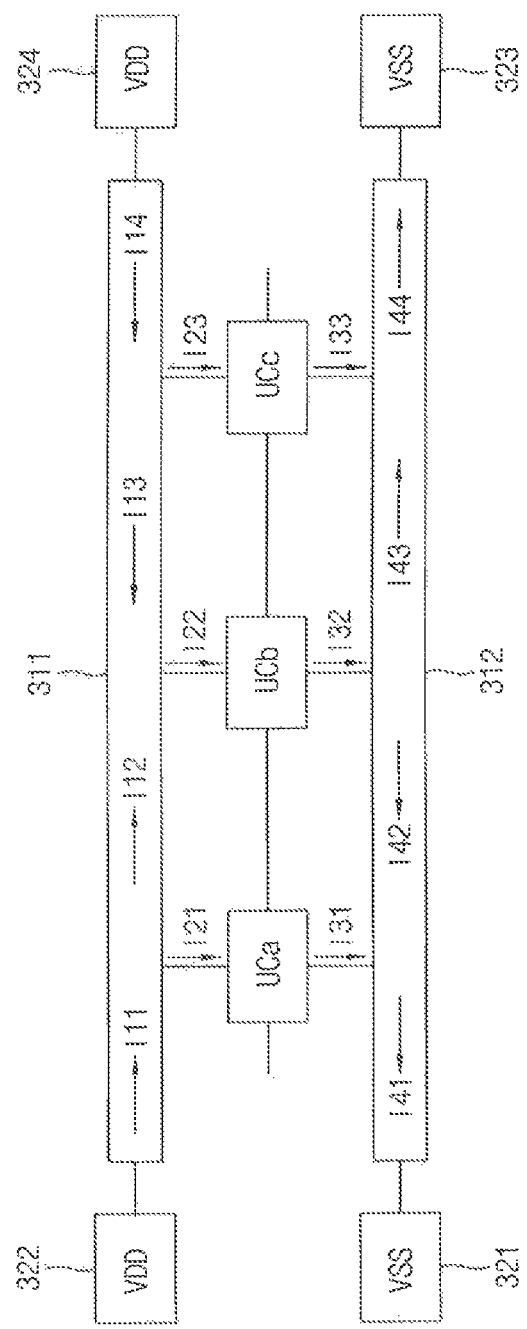
FIG. 19 is a diagram for describing ohmic drop in power rails.
Figure 20:
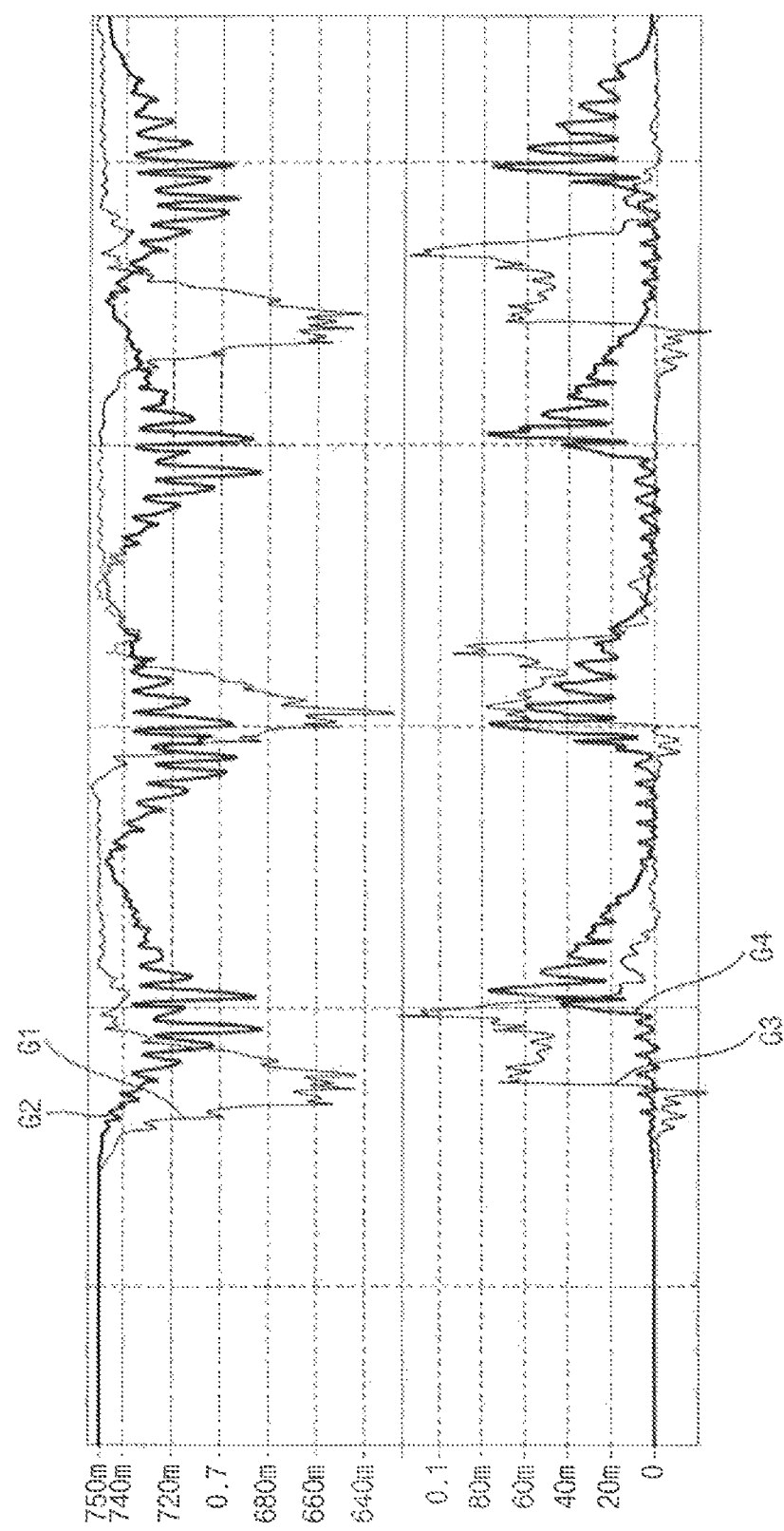
FIG. 20 is a diagram illustrating an effect of ohmic drop reduction in an integrated circuit according to an exemplary embodiment of the inventive concept.

FIG. 19 is a diagram for describing ohmic drop in power rails, and FIG. 20 is a diagram illustrating an effect of ohmic drop reduction in an integrated circuit according to an exemplary embodiment of the inventive concept.

Referring to FIG. 19, unit circuits UCa, UCb, and UCc may powered through the high power rail 311 configured to provide the first power supply voltage VDD and the low power rail 312 configured to provide the second power supply voltage VSS. Power may be supplied to the power rails 311 and 312 through power mesh routes 321~324.

FIG. 19 illustrates currents I11, I12, I13, and I14 flowing through the high power rail 311, sourcing currents I21, I22, and I23 flowing into the unit circuits UCa, UCb, and UCc, sinking currents I31, I32, and I33 flowing from the unit circuits UCa, UCb, and UCc, and currents I41, I42, I43, and I44 flowing through the low power rail 312. The current sum flowing into each node is equal to the current sum flowing from each node. The ohmic drop along each of the power rails 311 and 312 is increased as the distance from the power mesh routes 321~324 is increased or as the number of unit circuits connected to the power rails 311 and 312 is increased. Particularly, the ohmic drop may be increased significantly if the signals of adjacent unit circuits transmit simultaneously.

First and second waveforms G1 and G2 of the first power supply voltage VDD are illustrated in the upper portion of FIG. 20, and third and fourth waveforms G3 and G4 of the second power supply voltage VSS are illustrated in the lower portion of FIG. 20. In FIG. 20, the horizontal axis represents time and the vertical axis represents voltage. The first waveform G1 and the third waveform G3 correspond to a conventional circuit chain and the second waveform G2 and the fourth waveform G4 correspond to a circuit chain in which unit circuits are connected distributively to a plurality of power rail pairs according to an exemplary embodiment of the inventive concept.

As illustrated in FIG. 20, a peak value of the ohmic drop of the first power supply voltage VDD is reduced from about 110 mV in the first waveform G1 to about 55 mV in the second waveform G2. Additionally, a peak value of the ohmic drop of the second power supply voltage VSS is reduced from about 105 mV in the third waveform G3 to about 65 mV in the fourth waveform G4. Referring to the first and third waveforms G1 and G3 of the conventional scheme, the ohmic drop may be increased as operation currents are accumulated due to adjacent unit circuits connected to the same power rail pair toggling at substantially the same time. In contrast, referring to the second and fourth waveforms G2 and G4 according to an exemplary embodiment of the inventive concept, the ohmic drop may be reduced because the ohmic drop due to one unit circuit occurs after the ohmic drop due to another unit circuit is recovered, through the distributive connection of the unit circuits to the plurality of power rail pairs.

Figure 21:
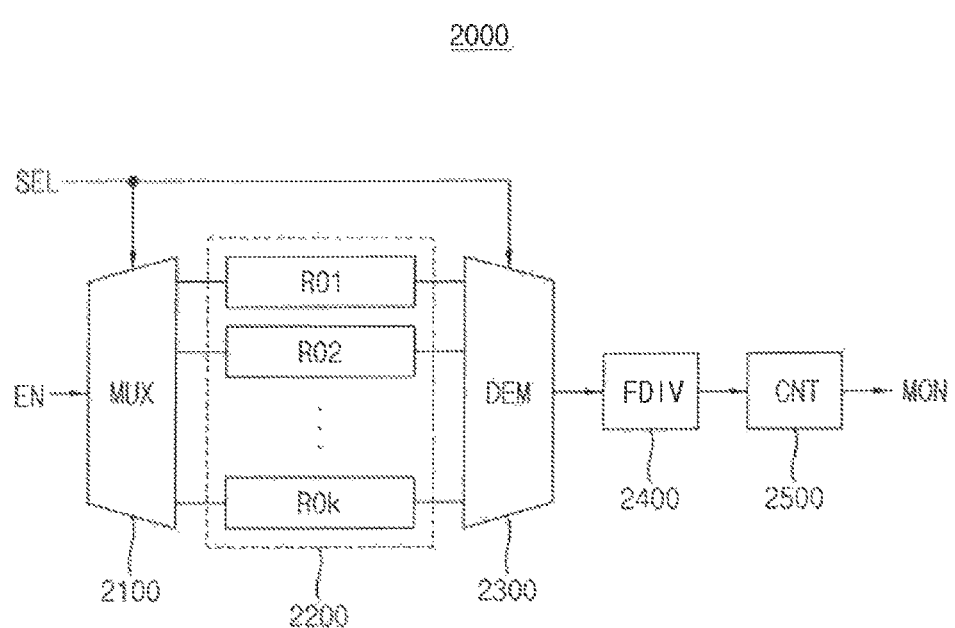
FIG. 21 is a block diagram illustrating an integrated circuit according to an exemplary embodiment of the inventive concept.

FIG. 21 is a block diagram illustrating an integrated circuit according to an exemplary embodiment of the inventive concept.

Referring to FIG. 21, an integrated circuit 2000 may include a multiplexer MUX 2100, an ring oscillator block 2200, a demultiplexer DEM 2300, a frequency divider FDIV 2400, and a counter CNT 2500.

The ring oscillator block 2200 may include a plurality of ring oscillators RO1~ROk having different operational characteristics. The operational characteristics may be various factors for testing silicon properties and on-chip variation (OCV) of the integrated circuit 2000. For example, the ring oscillators RO1~ROk may be implemented with inverters and/or differential amplifiers having different driving strengths.

The multiplexer 2100 may select and enable one of the ring oscillators RO1~ROk based on a selection signal SEL and an enable signal EN and the demultiplexer 2300 may provide an oscillation signal from the ring oscillator corresponding to the selection signal SEL. The frequency divider 2400 may divide the frequency of the oscillation signal and the frequency may be provided as a result signal MON by the counter 2500. According to exemplary embodiments of the inventive concept, the frequency divider 2400 may be omitted. As such, the silicon properties and the OCV of the integrated circuit 2000 may be monitored using the output of the ring oscillators RO1~ROk. The effect of the ohmic drop has to be minimized for increasing accuracy of monitoring. By applying the distributive power supply to the ring oscillators RO1~ROk as described above, the ohmic drop may be reduced and thus more accurate monitoring may be implemented.

Figure 22A:
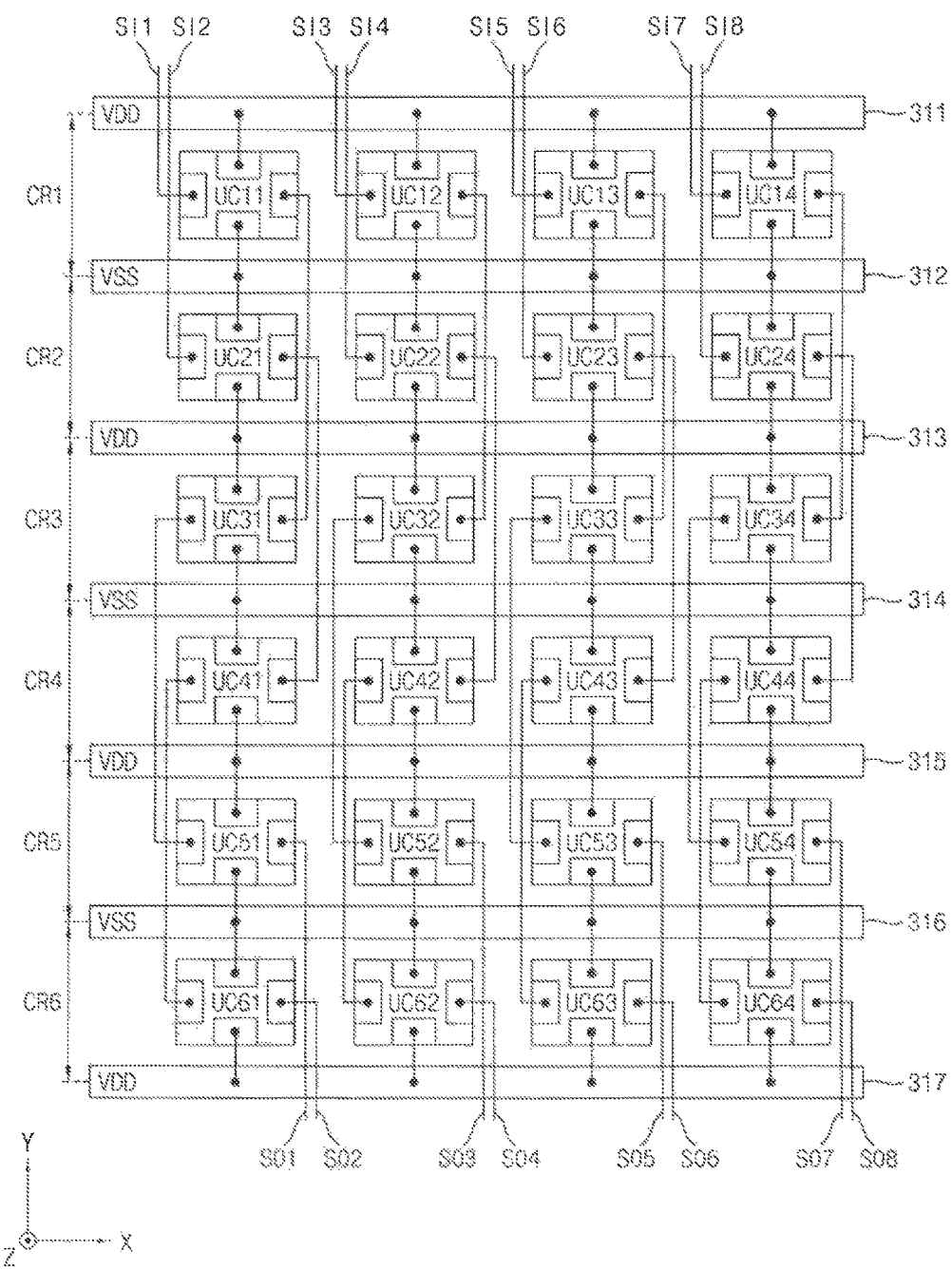
FIGS. 22A and 22B are diagrams illustrating layouts of a ring oscillator included in the integrated circuit of FIG. 21.
Figure 22B:
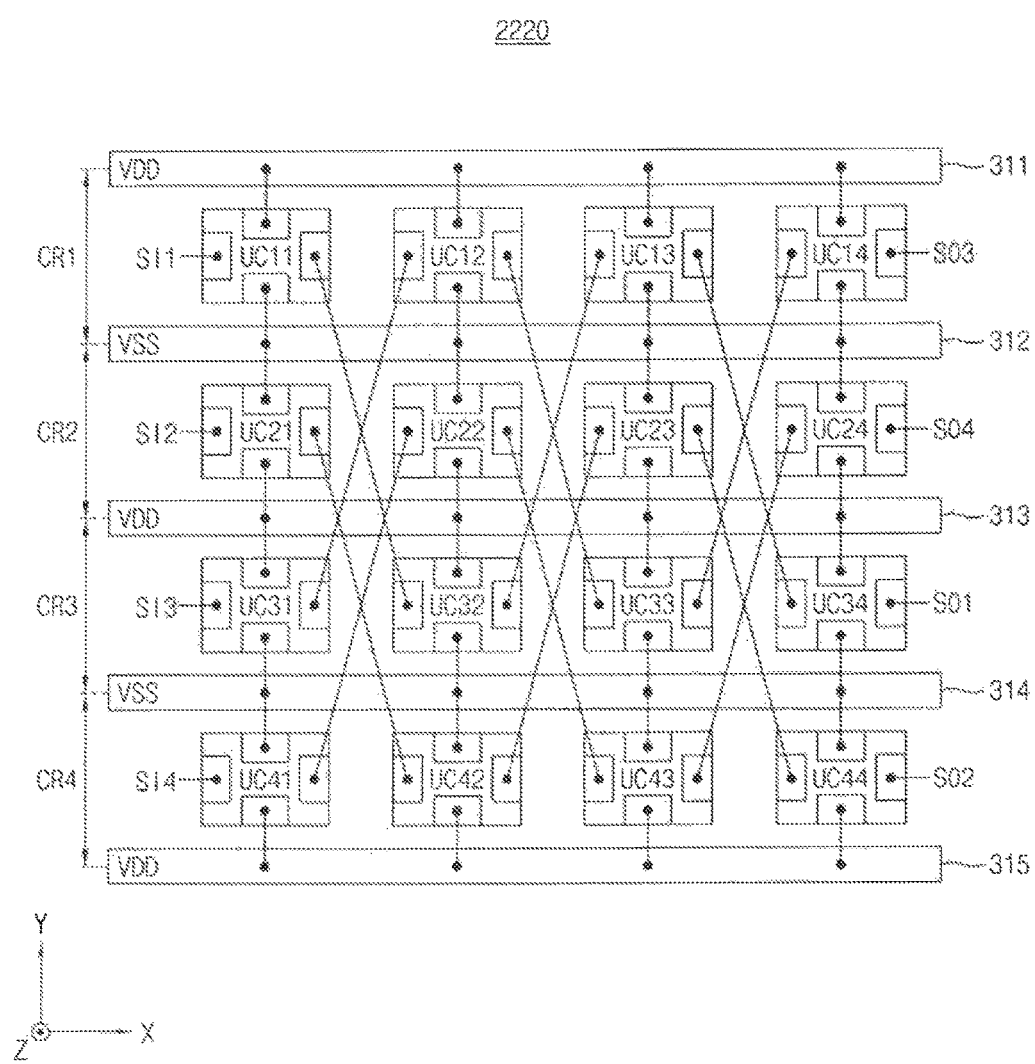

FIGS. 22A and 22B are diagrams illustrating layouts of a ring oscillator included in the integrated circuit of FIG. 21.

FIG. 22A illustrates an oscillator block 2210 including eight circuit chains to which the configuration of FIG. 11 is applied, and thus repeat descriptions of elements similar to those in FIG. 11 are omitted. A first circuit chain includes unit circuits UC11, UC31, and UC51 that are cascade-connected, a second circuit chain includes unit circuits UC21, UC41, and UC61 that are cascade-connected, a third circuit chain includes unit circuits UC12, UC32, and UC52 that are cascade-connected, a fourth circuit chain includes unit circuits UC22, UC42, and UC62 that are cascade-connected, a fifth circuit chain includes unit circuits UC13, UC33, and UC53 that are cascade-connected, a sixth circuit chain includes unit circuits UC23, UC43, and UC63 that are cascade-connected, a seventh circuit chain includes unit circuits UC14, UC34, and UC54 that are cascade-connected, and an eighth circuit chain includes unit circuits UC24, UC44, and UC64 that are cascade-connected. FIG. 22A illustrates that each circuit chain include three unit circuits for convenience of illustration, and the number of unit circuits included in each circuit chain may be determined variously. Output signals SO1~SO8 of the circuit chains are fed back as input signals SI1~SI8, respectively, and thus the circuit chains may be implemented as ring oscillators.

FIG. 22B illustrates an oscillator block 2220 including four circuit chains to which the configuration of FIG. 7 is applied, and thus repeat descriptions of elements similar to those in FIG. 7 are omitted. A first circuit chain includes unit circuits UC11, UC32, UC13, and UC34 that are cascade-connected, a second circuit chain includes unit circuits UC21, UC42, UC23, and UC44 that are cascade-connected, a third circuit chain includes unit circuits UC31, UC12, UC33, and UC14 that are cascade-connected, and a fourth circuit chain includes unit circuits UC41, UC22, UC43, and UC24 that are cascade-connected. FIG. 22B illustrates that each circuit chain include four unit circuits for convenience of illustration, and the number of unit circuits included in each circuit chain may be determined variously. The output signals SO1~SO4 of the circuit chains are fed back as the input signals SI1~SI4, respectively, and thus the circuit chains may be implemented as ring oscillators.

Figure 23:
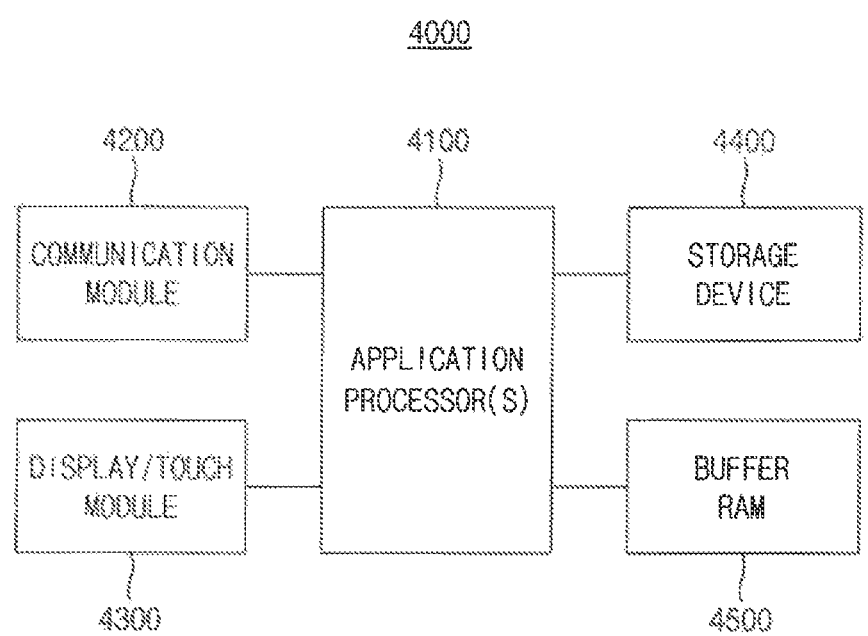
FIG. 23 is a block diagram illustrating a mobile device according to an exemplary embodiment of the inventive concept.

FIG. 23 is a block diagram illustrating a mobile device according to an exemplary embodiment of the inventive concept.

Referring to FIG. 23, a mobile device 4000 may include an application processor 4100, a communication module 4200, a display/touch module 4300, a storage device 4400, and a buffer RAM 4500.

At least one element of the mobile device 4000 may include at least one circuit chain in which a plurality of unit circuits are cascade-connected. According to exemplary embodiments of the inventive concept, the ohmic drop in the power rails may be reduced by connecting the cascade-connected unit circuits of the circuit chain distributively to the plurality of power rail pairs, and thus, performance of the mobile device 4000 may be enhanced.

The application processor 4100 controls operations of the mobile device 4000. The communication module 4200 can perform wireless or wired communications with an external device. The display/touch module 4300 can display data processed by the application processor 4100 and/or receive data through a touch panel. The storage device 4400 can store user data. The storage device 4400 may be an embedded multimedia card (eMMC), a solid state drive (SSD), a universal flash storage (UFS) device, etc. The storage device 4400 may include a power loss protection circuit and a capacitor module to perform efficient management of power and performance of the mobile device 4000. The buffer RAM 4500 temporarily stores data used for processing operations of the mobile device 4000. For example, the buffer RAM 4500 may be a double data rate (DDR) synchronous dynamic random access memory (SDRAM), a low power DDR (LPDDR) SDRAM, a graphics DDR (GDDR) SDRAM, a Rambus DRAM (RDRAM), etc.

The concepts described herein may be applied to any device or system. For example, these concepts may be applied to systems such as a mobile phone, a smart phone, a personal digital assistant (PDA), a portable multimedia player (PMP), a digital camera, a camcorder, a personal computer (PC), a server computer, a workstation, a laptop computer, a digital television (TV), a set-top box, a portable game console, a navigation system, etc.

As described above, according to exemplary embodiments of the inventive concept, the integrated circuit may reduce ohmic drop in the power rails by connecting the cascade-connected unit circuits of the circuit chain distributively to the plurality of power rail pairs, and thus, performance of the integrated circuit may be enhanced.

While the inventive concept has been shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. An integrated circuit comprising:
   a plurality of power rail pairs, wherein each of the plurality of power rail pairs includes one of a plurality of high power rails configured to provide a first power supply voltage and one of a plurality of low power rails configured to provide a second power supply voltage that is lower than the first power supply voltage; and
   a circuit chain including a plurality of unit circuits that are cascade-connected such that an output of a previous unit circuit is provided as an input of a next unit circuit, wherein the plurality of unit circuits are connected distributively to the plurality of power rail pairs,
   wherein the plurality of high power rails and the plurality of low power rails extend in a row direction and are arranged alternatively one by one in a column direction to form boundaries of a plurality of circuit rows that are arranged in the column direction.

2. The integrated circuit of claim 1, wherein, with respect to all of the plurality of unit circuits, two directly cascade-connected unit circuits are connected to two different power rail pairs, respectively, of the plurality of power rail pairs.

3. The integrated circuit of claim 2, wherein odd-numbered unit circuits of the plurality of unit circuits are connected to a first power rail pair of the plurality of power rail pairs, and even-numbered unit circuits of the plurality of unit circuits are connected to a second power rail pair of the plurality of power rail pairs.

4. The integrated circuit of claim 2, wherein three directly cascade-connected unit circuits are connected to three different power rail pairs, respectively, of the plurality of power rail pairs.

5. The integrated circuit of claim 1, wherein, with respect to all of the plurality of unit circuits, two directly cascade-connected unit circuits are disposed in two circuit rows, respectively, of the plurality of circuit rows, corresponding to two different power rail pairs of the plurality of power rail pairs.

6. The integrated circuit of claim 5, wherein each of the plurality of unit circuits is connected to a nearest high power rail of the plurality of high power rails and a nearest low power rail of the plurality of low power rails.

7. The integrated circuit of claim 1, wherein two directly cascade-connected unit circuits of the plurality of unit circuits are disposed adjacent to each other in a same circuit row of the plurality of circuit rows.

8. The integrated circuit of claim 7, wherein a first unit circuit of the two directly cascade-connected unit circuits is connected to a nearest high power rail of the plurality of high power rails and a nearest low power rail of the plurality of low power rails, and a second unit circuit of the two directly cascade-connected unit circuits is connected to a second nearest high power rail of the plurality of high power rails and a second nearest low power rail of the plurality of low power rails.

9. The integrated circuit of claim 7, wherein a first unit circuit of the two directly cascade-connected unit circuits is connected to a first power rail pair of the plurality of power rail pairs and a second unit circuit of the two directly cascade-connected unit circuits is connected to a second power rail pair of the plurality of power rail pairs such that the two directly cascade-connected unit circuits are disposed between the first power rail pair and the second power rail pair in the column direction.

10. The integrated circuit of claim 1, wherein the circuit chain is a ring oscillator such that an output of a last unit circuit of the plurality of unit circuits is provided as an input of a first unit circuit of the plurality of unit circuits.

11. The integrated circuit of claim 10, wherein the circuit chain is a single-ended ring oscillator such that the plurality of unit circuits is implemented with inverters.

12. The integrated circuit of claim 10, wherein the circuit chain is a differential oscillator such that the plurality of unit circuits is implemented with differential amplifiers.

13. The integrated circuit of claim 1, wherein the circuit chain is a delay circuit such that each of the plurality of unit circuits has a unit delay amount.

14. An integrated circuit comprising:
a plurality of power rail pairs, wherein each of the plurality of power rail pairs includes one of a plurality of high power rails configured to provide a first power supply voltage and one of a plurality of low power rails configured to provide a second power supply voltage that is lower than the first power supply voltage; and
a plurality of circuit chains, wherein each of the plurality of circuit chains includes a plurality of unit circuits that are cascade-connected such that an output of a previous unit circuit is provided as an input of a next unit circuit, wherein the plurality of unit circuits are connected distributively to the plurality of power rail pairs.

15. An integrated circuit comprising:
first through N-th power rail pairs including first through N-th high power rails, respectively, configured to provide a first power supply voltage and first through N-th low power rails, respectively, configured to provide a second power supply voltage that is lower than the first power supply voltage; and
a circuit chain including first through N-th unit circuits that are cascade-connected such that an output of a previous unit circuit is provided as an input of a next unit circuit, wherein the first through N-th unit circuits are connected to the first through N-th power rail pairs, respectively,
wherein the first through N-th high power rails and the first through N-th low power rails extend in a row direction and are arranged alternatively one by one in a column direction, and
wherein the first through N-th unit-circuits are disposed in a diagonal direction that is diagonals to the row or column direction, or are substantially aligned in the column direction.

16. The integrated circuit of claim 15,
wherein the first through N-th unit circuits have substantially the same structure.

17. The integrated circuit of claim 15,
wherein odd-numbered unit circuits of the first through N-th unit circuits have substantially the same structure such that input and output pins thereof are substantially aligned in the column direction,
wherein even-numbered unit circuits of the first through N-th unit circuits have substantially the same structure such that input and output pins thereof are substantially aligned in the column direction, and
wherein an output pin of the first unit circuit and an input pin of the second unit circuit that is directly adjacent to the first unit circuit are connected and substantially aligned in the column direction.

18. The integrated circuit of claim 15, wherein an output signal of the N-th unit circuit is provided as an input signal to the first unit circuit.

* * * * *